(12) United States Patent
Müller et al.

(10) Patent No.: US 9,469,715 B2
(45) Date of Patent: Oct. 18, 2016

(54) METHOD FOR PRODUCING FORMALDEHYDE/CO₂ COPOLYMERS

(71) Applicant: Covestro Deutschland AG, Leverkusen (DE)

(72) Inventors: Thomas Ernst Müller, Aachen (DE); Christoph Gürtler, Köln (DE); Henning Vogt, Aachen (DE); Mario Krautschick, Hüchelhoven (DE); Walter Leitner, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/654,665

(22) PCT Filed: Dec. 17, 2013

(86) PCT No.: PCT/EP2013/076899
§ 371 (c)(1),
(2) Date: Jun. 22, 2015

(87) PCT Pub. No.: WO2014/095861
PCT Pub. Date: Jun. 26, 2014

(65) Prior Publication Data
US 2015/0337070 A1    Nov. 26, 2015

(30) Foreign Application Priority Data
Dec. 21, 2012 (EP) .................... 12199047

(51) Int. Cl.
| C08G 10/02 | (2006.01) |
| C08G 16/02 | (2006.01) |
| C08G 2/06  | (2006.01) |
| C08G 2/08  | (2006.01) |
| C08G 64/02 | (2006.01) |
| C08G 64/32 | (2006.01) |
| C08L 59/04 | (2006.01) |
| C08G 12/02 | (2006.01) |

(52) U.S. Cl.
CPC ............ *C08G 16/0206* (2013.01); *C08G 2/06* (2013.01); *C08G 2/08* (2013.01); *C08G 64/0208* (2013.01); *C08G 64/32* (2013.01); *C08L 59/04* (2013.01)

(58) Field of Classification Search
CPC ... C08G 65/00; C08G 18/4887; C08G 18/08
USPC .................................................... 528/234, 237
See application file for complete search history.

(56) References Cited

U.S. PATENT DOCUMENTS

| 3,218,295 | A | 11/1965 | Cline |
| 3,575,930 | A | 4/1971 | Dinbergs |
| 3,754,053 | A | 8/1973 | Kray et al. |
| 3,979,479 | A | 9/1976 | Radici et al. |
| 4,352,914 | A | 10/1982 | Tobinaga |
| 4,535,127 | A | 8/1985 | Matsuzaki et al. |
| 5,432,207 | A * | 7/1995 | Rader ............... C08G 14/04 521/128 |
| 7,001,959 | B2 | 2/2006 | Muck et al. |
| 2002/0016395 | A1 | 2/2002 | Niino et al. |
| 2015/0322213 | A1* | 11/2015 | Muller ............... C08G 18/56 525/472 |
| 2015/0368396 | A1* | 12/2015 | Muller ............... C08G 65/00 528/76 |

FOREIGN PATENT DOCUMENTS

| EP | 1 418 190 A1 | 5/2004 |
| GB | 807589 A | 1/1959 |
| GB | 1164997 A | 9/1969 |
| JP | 04-306215 A | 10/1992 |
| JP | 2007-211082 A | 8/2007 |
| WO | WO-9606118 A1 | 2/1996 |

OTHER PUBLICATIONS

International Search Report for PCT/EP2013/076899 mailed Jul. 17, 2014.
Sharma et al., "Copolymerization reactions of carbon dioxide, Preprints of Papers", American Chemical Society. Division of Fuel Chemistry, vol. 45, No. 4 pp. 676-680 (Jan. 1, 2000).
Office Action dated Jan. 25, 2016 for U.S. Appl. No. 14/654,640.

* cited by examiner

*Primary Examiner* — Terressa Boykin
(74) *Attorney, Agent, or Firm* — K&L Gates LLP

(57) ABSTRACT

The invention relates to a method for producing non-alternating formaldehyde/CO2 copolymers, said method comprising the step of reacting formaldehyde or a compound that releases formaldehyde with carbon dioxide in the presence of a catalyst system. Said method is characterized in that the catalyst system comprises a Lewis acid component and a basic component, the Lewis acid component being at least temporarily coordinatively unsaturated under reaction conditions and the basic component having a pKb value of >=0.

18 Claims, No Drawings

METHOD FOR PRODUCING FORMALDEHYDE/CO₂ COPOLYMERS

CROSS-REFERENCE TO RELATED APPLICATIONS

This application is a national stage application (under 35 U.S.C. §371) of PCT/EP2013/076899, filed Dec. 17, 2013, which claims benefit of European Application No. 12199047.7, filed Dec. 21, 2012, both of which are incorporated herein by reference in their entirety.

The present invention relates to a process for preparing nonalternating formaldehyde/$CO_2$ copolymers.

Nonalternating formaldehyde/$CO_2$ copolymers are of interest as feedstocks in the polyurethane sector, and for applications in the polyoxymethylene (POM) sector. By altering the $CO_2$ content, the physical properties can be matched to the particular use, as result of which it is possible to develop new fields of use for polymers. Because of their $CO_2$ fixing potential, they have a more favorable $CO_2$ balance compared to existing products (for example polyethers in the polyurethane sector or high molecular weight homopolymers of formaldehyde in the POM sector).

WO 96/06118 describes the cationic polymerization of monomers in liquid, gaseous or supercritical carbon dioxide, wherein formaldehyde can also be used as a monomer. Cationic polymerization catalysts are used. However, the incorporation of carbon dioxide to form formaldehyde/$CO_2$ copolymers is not disclosed.

The preparation of alternating formaldehyde/$CO_2$ copolymers from aqueous formaldehyde solution using dry ice as $CO_2$ source and using tertiary amines as polymerization catalyst was described by Chiang in Tatung Xuebao (1978), 8, 255-265. In the resulting products, formaldehyde and $CO_2$ units are present in an equimolar ratio.

Sharma and Olson describe the preparation of alternating formaldehyde/$CO_2$ copolymers proceeding either from aqueous formaldehyde solution or from paraformaldehyde using dry ice as $CO_2$ source (Preprints of Symposia—American Chemical Society (2000), 45-4, 676). Catalysts used were likewise tertiary amines. Also used were zinc bisanil catalysts. In the resulting products, formaldehyde and $CO_2$ units are present in an equimolar ratio.

No preparation process for nonalternating formaldehyde/$CO_2$ copolymers is disclosed in the prior art.

The problem addressed by the present invention was that of providing nonalternating formaldehyde/$CO_2$ copolymers and a process for preparation thereof.

It has now been found that, surprisingly, the use of a suitably selected combination of a Lewis-acidic catalyst and a basic catalyst in the copolymerization of formaldehyde and $CO_2$ leads to nonalternating formaldehyde/$CO_2$ copolymers.

The invention therefore provides a process for preparing nonalternating formaldehyde/$CO_2$ copolymers, comprising the step of reacting formaldehyde or a formaldehyde-releasing compound with carbon dioxide in the presence of a catalyst system, wherein the catalyst system comprises a Lewis-acidic component and a basic component, the Lewis-acidic component under reaction conditions is at least intermittently coordinatively unsaturated and the basic component has a $pK_b$ of $\geq 0$.

The term "alternating" for the purposes of the present invention should be understood to mean that, within the polymer chain, every $CO_2$ unit is joined to two formaldehyde units and every formaldehyde unit to two $CO_2$ units. In the end groups of the polymer chain, in the case of alternating polymers, it is also possible for units in which a $CO_2$ unit is joined to a formaldehyde unit and an end group and/or a formaldehyde unit to a $CO_2$ unit and an end group to occur.

Nonalternating formaldehyde/$CO_2$ copolymers for the purposes of the present invention are those copolymers in which two or more formaldehyde units are joined via carbonate units, Nonalternating formaldehyde/$CO_2$ copolymers for the purposes of the invention may contain alternating formaldehyde/$CO_2$ sequences, but contain, in the polymer chain, at least one nonalternating sequence in which two or more formaldehyde units are joined directly to one another, where the relative ratio of formaldehyde to $CO_2$ units is >1:1, preferably >1.5:1.

It is a feature of the Lewis-acidic component (also called "polymerization catalyst" hereinafter) that it contains at least one metal atom which is at least intermittently coordinatively unsaturated under reaction conditions. In general, the selection is made according to whether the Lewis-acidic component is suitable for homopolymerization of formaldehyde. Consequently, the Lewis-acidic component may be a free or complexed metal ion.

Polymerization catalysts of this kind contain, as the Lewis-acidic center, one or more coordinatively unsaturated metal atoms, for example boron, aluminum, metals of the third and fourth transition group and metals of the lanthanoid series, vanadium, molybdenum, tungsten, metals of the eighth to tenth transition groups, especially iron, cobalt, nickel, rhodium, iridium, palladium, platinum, copper, zinc, tin and bismuth. Nucleophilic binding partners can bind to the coordinatively unsaturated Lewis-acidic center.

The coordinatively unsaturated Lewis-acidic center may already be present in the compound used as catalyst or is formed in the reaction mixture, for example, through detachment of a weakly hound nucleophilic binding partner which, after detachment from the polymerization catalyst, can form a stable, electronically uncharged or negatively charged compound. Examples of weakly bound nucleophilic binding partners which, after detachment from the polymerization catalyst, can form a stable, electronically uncharged or negatively charged compound are halides, for example fluoride, chloride, bromide or iodide, cyanide, cyanate, isocyanate, azide, carbon monoxide, carbon dioxide, nitrogen, or organic compounds containing nitrogen, oxygen, phosphorus or sulfur atoms and/or isolated or conjugated double bond systems with which they can form bonds to the metal atom. Examples of these are organic nitriles, for example acetonitrile, ethers, for example tetrahydrofuran or diethyl ether, thioethers, for example dimethyl sulfide, alkenes, for example ethene, cyclooctaene or cyclooctadiene, linear or branched, saturated or mono- or polyunsaturated C1 to C20 alkoxides, linear or branched, saturated or mono- or polyunsaturated C1 to C20 carboxylates, linear or branched, saturated or mono- or polyunsaturated C1 to C20 sulfonates, primary, secondary or tertiary C1 to C20 amines, N-alkyl- or N-arylalkylideneamines, N-alkyl- or N-arylbenzylideneamines, trialkylphosphines, triarylphosphines or mixed alkylarylphosphines, trialkyl phosphites, triaryl phosphites or mixed aryl alkyl phosphites, trialkylphosphine oxides, triarylphosphine oxides or mixed alkylarylphosphine oxides, unsubstituted or mono- or polysubstituted acetylacetonates, unsubstituted or mono- or polysubstituted 1,3-arylpropane-1,3-dionates, unsubstituted or mono- or polysubstituted cyclopentadienyl anions, unsubstituted or mono- or polysubstituted benzene derivatives.

Binding partners which, after detachment from the polymerization catalyst, can form a stable electronically uncharged or negatively charged compound should also be considered to include binding partners which have additional nitrogen, oxygen, phosphorus and/or sulfur atoms and/or double bonds by which they are bound to the metal atom, and which, after removal of a bond to the metal atom, remain bound to the metal atom via at least one further bond. Examples thereof are bisphosphines, for example 1,2-bis (diphenylphosphino)ethane, 1,3-bis(diphenylphosphino) propane, 1,4-bis(diphenylphosphino)butane, diols, for example 1,2-ethanediol, 1,2- or 1,3-propanediol, 2,3-butanediol, diamines, for example 1,2-ethylenediamine, 1,2-cyclohexylenediamine, 1,2-diaminobenzene or -toluene, or salen compounds derived through reaction with aldehydes from diamines such as 1,2-ethylenediamine, 1,2-cyclohexylenediamine or 1,2-diaminobenzene, and 1,5-cyclooctadiene or 1,3,5,7-cyclooctatetraene.

Preferred polymerization catalysts are compounds containing at least one metal atom selected from the group consisting of boron, aluminum, vanadium, molybdenum, tungsten, tin, bismuth, metals of the third and fourth transition group, and metals of the lanthanoid series, metals of the eighth to tenth transition group (for example iron, cobalt, nickel, rhodium, iridium, palladium, platinum, and copper, zinc).

It is particularly preferable when the Lewis-acidic component comprises a metal selected from the group of boron, tin, bismuth, zinc, copper, molybdenum, tungsten and/or vanadium.

Very particularly preferred polymerization catalysts are boron trifluoride diethyl etherate, tris(pentafluorophenyl) borane, dibutyltin dilaurate (DBTL), tin bis(2-ethylhexanoate), tin(II) acetate, copper bis(2-ethylhexanoate), copper naphthenate, zinc bis(2-ethylhexanoate), lithium molybdate, molybdenum dioxydi(acetylacetonate), gallium tris(acetylacetonate), bismuth tris(2-ethylhexanoate), lithium orthovanadate, vanadium(V) oxy triethoxide, vanadium(V) oxy tripropoxide, vanadium(V) oxy triisopropoxide and/or vanadium(V) oxy tris(acetylacetonate).

It is a feature of the Lewis-basic catalyst (also called "basic catalyst" hereinafter) that it has Lewis-basic properties and hence can form at least one free, unbound electron pair which can form a single bond. Preferably, the free electron pair is on a heteroatom such as nitrogen, oxygen or phosphorus, or a carbon atom bonded to at least one heteroatom. More preferably, the free electron pair is on nitrogen, oxygen or phosphorus.

Examples of basic catalysts are
i) ionic compounds consisting of one or more basic anions (for example carbonate, linear or branched, saturated or mono- or polyunsaturated C1 to C20 carboxylates, phosphate, mono- or dihydrogenphospbate, polyphosphates), and one or more suitably selected counterions, for example the cations from the group of the alkali metals or alkaline earth metals, tetraalkyl-, tetraaryl-, monoalkyltriaryl-, dialkyldiaryl- or trialkylnionoarylphosphonium, tetraalkylammonium, N,N'-dialkyl-, N,N'-diaryl-, N-alkyl-N'-arylimidazolium, N,N'-dialkyl-, N,N'-diaryl-, N-Alkyl-N'-aryl-imidazolidinium or N,N'-dialkyl-, N,N'-diaryl, N-alkyl-N'-aryltriazolium, N-alkylpyridinium, or
ii) molecular organic Lewis bases, for example tertiary or aromatic basic amines (for example triethylamine and other trialkylamines, pyridine and mono- or polysubstituted pyridine derivatives, for example 2,6-lutidine, N-alkyl- or N'-arylimidazole, 1,4-diazabicyclo[2.2.2] octane (DABCO), 4-(dimethylamino)pyridine (DMAP), 1,8-diazabicyclo[5.4.0]undec-7-ene (DBU), triazabicyclo[4.4.0]dec-5-ene (TBD), 7-methyl-1,5,7-triazabicyclo[4.4.0]dec-5-ene (MTBD), trialkyl-, triaryl- or mixed alkylarylphospbines (for example triphenylphosphine, trimesitylphosphine, tri(2,6-diisopropylphenyl)phosphine, tri-tert-butylphosphine) or N-heterocyclic carbenes (for example 1,3-dimesityl-, 1,3-diisopropyl- or 1,3-di(2,6-diisopropylphenyl) imidazol-2-ylidene, 1,3-dimesityl-, 1,3-diisopropyl- or 1,3-di(2,6-diisopropylphenyl)imidazolidin-2-ylidene or 1,3-dimesityl-, 1,3-diisopropyl- or 1,3-di-(2,6-diisopropylphenyl)benzimidazol-2-ylidene).

According to the invention, the basic component has a $pK_b$ (base strength) of ≥0. This $pK_b$ is preferably ≥1 to ≥10, more preferably ≥1.5 to ≤8. The base strength can be determined from the dissociation constant $pK_a$ of the corresponding acid in aqueous solution at 25° C. In the case of polyvalent bases, the first dissociation stage is considered. For better classification, some examples are given: $NH_3$ has a $pK_b$ of 4.79 and the hydroxide ion a $pK_b$ of −1.74. The $pK_b$ of potassium tert-butoxide is −3.

In this respect, strong bases such as hydroxides and alkoxides are not used as basic components of the catalyst system in the process of the invention.

Preferably, the basic component is selected from the group of alkali metal carbonates, alkali metal carboxylates, 1,4-diazabicyclo[2.2.2]octane (DABCO), 4-(dimethylamino)pyridine (DMAP), 1,8-diazabicyclo[5.4.0]undec-7-ene (DBU), triazabicyclo[4.4.0]dec-5-ene (TBD), 7-methyl-1.5.7-triazabicyclo[4.4.0]dec-5-ene (MTBD), 2,6-lutidine, N-heterocyclic carbenes and/or trimesitylphosphine. Particular preference is given to cesium carbonate, DABCO, DBU, TBD, MTBD, 2,6-lutidine and/or trimesitylphosphine.

Examples of $pK_b$ values of preferred basic components are $pK_b$=5.18 for DABCO, $pK_b$=4.8 for DMAP and $pK_b$=7.25 for 2,6-lutidine.

Preferred combinations of Lewis-acidic component and basic component are dibutyltin dilaurate (DBTL), tin(II) acetate, tin bis(2-ethylhexanoate), bismuth tris(2-ethylhexanoate), zinc bis(2-ethylhexanoate), copper bis(2-ethylhexanoate) and/or copper naphthenate with cesium carbonate or with DABCO.

The two catalyst components of the catalyst system may also be combined in one substance, such that this substance functions both as polymerization catalyst and as basic catalyst. Such substances are regarded as two different components for the purposes of the invention and are therefore explicitly incorporated as well.

Thus, it is possible that the catalyst system takes the form of a frustrated Lewis pair. In frustrated Lewis pairs (frustrated Lewis acid-base pairs; FLP), a Lewis acid LA and a Lewis base LB are selected such that they cannot form adducts with one another in free form. This can be achieved by means of suitable, sterically demanding substituents.

In the context of the present invention, LB and LA do not form adducts with one another when the bond enthalpy LB+LA→LB–LA is ≤15 kcal/mol and preferably ≤10 kcal/mol. This value can be determined by means of density-functional calculations at the B3LYP level. A convenient alternative to DFT calculations is the determination of the bond enthalpy by means of dynamic temperature-dependent nuclear resonance spectroscopy (NMR spectroscopy), A further convenient alternative to DFT calculations is the determination of the bond enthalpy by means of titration calorimetry.

In one embodiment, LA is a diarylborane or a triarylborane. Such diaryl- or triarylboranes may bear, for example, unsubstituted or substituted phenyl radicals. It is preferable that LA is bis(perttaffuorophenyl)borane or tris(pentafluorophenyl)borane. As a result of the fluorine substituents, these compounds are strong Lewis acids.

In a further embodiment, LB is a trisubstituted phosphine. Such phosphines may bear, for example, unsubstituted or substituted phenyl radicals, it is preferable that LB is tris (ortho-tolyl)phosphine, tris(2,4,6-trimethylphenyl)phosphine, tri-tert-butylphosphine or [bis-2,5-(trifluoromethyl)phenyl]diphenylphosphine. In these phosphines, the phosphorus atom has significant steric shielding by the substituents.

Frustrated Lewis pairs are described, for example, in Angew. Chem. Int. Ed. (2010), 49, 46, Dalton Trans. (2011), 40, 7475 or Angew. Chem. Int. Ed. (2011), 50, 10294. Preferred frustrated Lewis pairs are (4-dimesitylphosphino-2,3,5,6-tetrafluorophenyl)di(pentafluorophenyl)borane and (2-dimesitylphosphinoethyl)di(pentafluorophenyl)borane.

For the preparation of the inventive nonalternating formaldehyde/$CO_2$ copolymers, a mixture of formaldehyde or a suitable formaldehyde source is contacted with carbon dioxide, optionally in a suitable solvent, with at least one polymerization catalyst and at least one basic catalyst.

Formaldehyde can be used in the gaseous state, optionally as a mixture with inert gases, for example nitrogen or argon, or as a mixture with gaseous, supercritical or liquid carbon dioxide, or in the form of a formaldehyde solution. Formaldehyde solutions may be aqueous formaldehyde solutions having a formaldehyde content between 1% by weight and 37% by weight, which optionally contain up to 15% by weight of methanol as stabilizer. Alternatively, it is possible to use solutions of formaldehyde in polar organic solvents, for example methanol or higher mono- or polyhydric alcohols, 1,4-dioxane, acetonitrile, N,N'-dimethylformamide (DMF), N,N-dimethylacetamide, dimethyl sulfoxide (DMSO), cyclic carbonates, for example ethylene carbonate or propylene carbonate, N-methylpyrrolidone (NMP), sulfolane, tetramethylurea, N,N'-dimethylethyleneurea or mixtures thereof with one another, or with water and/or other solvents. The presence of further substances, for example as stabilizers, in solution is not ruled out.

Alternatively, formaldehyde can be generated in situ from a suitable formaldehyde source. Formaldehyde sources used may be substances which contain chemically bound formaldehyde, typically in the form of oxymethylene groups, and are capable of releasing formaldehyde under suitable conditions. Suitable conditions for the release may include, for example, elevated temperatures and/or the use of catalysts and/or the presence of acids, bases or other reagents which lead to the release of monomeric formaldehyde. Preferred formaldehyde sources are 1,3,5-trioxane, paraformaldehyde, polyoxymethylene, dimethyl acetal, 1,3-dioxolane, 1,3-dioxane and/or 1,3-dioxepane, particular preference being given to 1,3,5-trioxane and paraformaldehyde.

Carbon dioxide can be used in the gaseous, solid, liquid or supercritical state, preferably in the gaseous or solid state, more preferably in the gaseous state. In the case of use of carbon dioxide in the gaseous state, a partial carbon dioxide pressure of 1 to 73.8 bar, preferably of 1 to 50 bar, more preferably of 5 to 30 bar, is chosen. The combination of pressure and temperature in the case of use of gaseous carbon dioxide is chosen such that carbon dioxide as a pure substance is in the gaseous state under the chosen reaction conditions. The corresponding conditions can be inferred from the phase diagram. After introduction of gaseous carbon dioxide into the reactor, it dissolves partly or fully in the reaction mixture.

The polymerization catalyst (Lewis-acidic component) can be used in a molar ratio of 1:100 000 to 1:10, preferably 1:100 000 to 1:50, more preferably 1:50 000 to 1:90 relative to formaldehyde or the formaldehyde equivalents present in the formaldehyde source.

The basic component can be used in a molar ratio of 1 100 000 to 1:1, preferably 1:100 000 to 1:5, more preferably 1:50 000 to 1:10 and most preferably 1:500 to 1:10 relative to formaldehyde or the formaldehyde equivalents present in the formaldehyde source.

The molar ratio of Lewis-acidic component to basic component may be 1:2000 to 10:1, preferably 1:1000 to 10 1, more preferably 1:1000 to 1:1 and most preferably 1:500 to 1:1.

As well as the polymerization catalyst and the basic catalyst, it is possible to use further catalysts, cocatalysts or additives which, for example, increase the solubility of the basic catalyst, for example crown ethers or tetraalkylammonium salts, in substoichiometric, stoichiometric or superstoichiometric amounts relative to the catalysts of the invention.

The reaction is generally conducted at a temperature between 20 and 250° C. inclusive, preferably between 40 and 200° C. inclusive and more preferably between 60 and 180° C. inclusive. In the case of use of a formaldehyde source containing chemically bound formaldehyde, the reaction temperature should be above the breakdown temperature present under the given conditions. In the presence of suitable catalysts which accelerate the release of formaldehyde, the reaction temperature may be below the temperature for the uncatalyzed thermal conversion. In some cases, the polymerization catalysts and/or basic catalysts of the invention may likewise function as catalysts for the release of formaldehyde.

Solvents used may, for example, be water, methanol or higher mono- or polyhydric alcohols, nonpolar organic solvents, for example linear or branched alkanes or alkane mixtures, toluene, the various xylene isomers or mixtures thereof, mesitylene, mono- or polyhalogenated aromatics or alkanes, open-chain or cyclic ethers, for example tetrahydrofuran (THF) or methyl tert-butyl ether (MTBE), open-chain or cyclic esters, or polar aprotic solvents, for example 1,4-dioxane, acetonitrile, N,N-dimethylformamide (DMF), N,N-dimethylacetamide, dimethyl sulfoxide (DMSO), cyclic carbonates, for example ethylene carbonate or propylene carbonate, N'-methylpyrrolidone (NMP), sulfolane, tetramethylurea, N,N'-dimethylethyleneurea or mixtures thereof with one another, or with water and/or other solvents. It is also possible to use liquid or supercritical carbon dioxide as solvent in neat form or as a mixture with one of the abovementioned solvents. Preference is given to water, alcohols, polar aprotic solvents and supercritical carbon dioxide, particular preference to 1,4-dioxane, acetonitrile, DMF, N,N-dimethylacetamide, DMSO, ethylene carbonate, propylene carbonate, NNP and sulfolane.

The reaction time is generally 0.05 to 120 hours, preferably 0.5 to 48 hours, more preferably 1 to 24 hours. The reaction time is regarded as the period of time in which the reaction mixture is in contact with the catalyst mixture at the chosen reaction temperature.

The reaction can be conducted by a batchwise, semicontinuous or continuous method. In the case of a semicontinuous reaction regime, the reactants can be metered into the running reaction individually as gases or liquids, or in a mixture. In a preferred embodiment of the semicontinuous method, a mixture of polymerization catalyst, basic catalyst and a solvent is initially charged, and formaldehyde or the formaldehyde source is metered into the reaction in neat form as a gas or liquid or in solution. In the case of a semicontinuous or continuous reaction regime, the reaction can be conducted in a continuous stirred tank reactor (CSTR), in a stirred tank cascade or in a flow tube.

In one embodiment of the process, the resulting nonalternating formaldehyde/$CO_2$ copolymer is stabilized by addition of epoxides. The addition of epoxides to the reaction mixture can be effected during the polymerization reaction, directly after the polymerization reaction, on completion of the polymerization reaction or to the isolated product. Preferred epoxides are ethylene oxide, propylene oxide, cyclohexene oxide or styrene oxide. If appropriate, the stabilization is effected in the presence of a further catalyst which catalyzes the reaction of OH groups with epoxides. Suitable catalysts are, for example, potassium hydroxide and other alkali metal or alkaline earth metal hydroxides, titanium compounds, for example titanium tetrachloride or titanium tetraalkoxides, dialkylzinc compounds, especially diethylzinc, or zinc complexes such as zinc phenoxide or other zinc alkoxides, zinc β-diiminaxes, β-diketiminate zinc amide, mixed zinc/cobalt cyanides, chromium (III)-salen complexes or cobalt (III)-salen complexes.

In a further embodiment of the process, the resulting nonalternating formaldehyde/$CO_2$ copolymer is stabilized by addition of cyclic acetals. The addition of the cyclic acetals to the reaction mixture can be effected during the polymerization reaction, directly after the polymerization reaction, on completion of the polymerization reaction or to the isolated product. Preferred cyclic acetals are 1,3-dioxolane, 1,3-dioxane or 1,3-dioxepane. If appropriate, the stabilization is effected in the presence of a further catalyst which catalyzes the reaction of OH groups with acetals. Suitable catalysts are, for example, boron trifluoride etherate, aluminum trichloride, tin tetrachloride, tin dialkoxides or tin dicarboxylates, DBTL or titanium tetrachloride.

In a further embodiment of the process, the resulting nonalternating formaldehyde/$CO_2$ copolymer is stabilized by addition of carboxylic anhydrides. The addition of the carboxylic anhydrides to the reaction mixture can be effected during the polymerization reaction, directly after the polymerization reaction, on completion of the polymerization reaction or to the isolated product. Preferred carboxylic anhydrides are acetic anhydride, glutaric anhydride, maleic anhydride or phthalic anhydride. If appropriate, the stabilization is effected in the presence of a further catalyst which catalyzes the reaction of OH groups with carboxylic anhydrides. Suitable catalysts are, for example, boron trifluoride etherate, aluminum trichloride, tin tetrachloride, titanium tetrachloride, pyridine, DABCO or trialkylamines.

In a further embodiment of the process, the resulting nonalternating formaldehyde/$CO_2$ copolymer is stabilized by addition of organic carbonates. The addition of the organic carbonates to the reaction mixture can be effected during the polymerization reaction, directly after the polymerization reaction, on completion of the polymerization reaction or to the isolated product, Preferred organic carbonates are dimethyl carbonate, diphenyl carbonate, ethylene carbonate, propylene carbonate, trimethylene carbonate, neopentyl carbonate. If appropriate, the stabilization is effected in the presence of a further catalyst which catalyzes the reaction of OH groups with carbonates. Suitable catalysts are, for example, zinc complexes such as zinc phenoxide or other zinc alkoxides, zinc β-diiminates, β-diketiminate zinc amide, mixed zinc/cobalt cyanides, chromium (III)-salen complexes, cobalt (III)-salen complexes, boron trifluoride etherate, aluminum trichloride, tin tetrachloride or titanium tetrachloride.

In a further embodiment of the process, the resulting nonalternating formaldehyde/$CO_2$ copolymer is stabilized by addition of organic isocyanates. The addition of the organic isocyanates to the reaction mixture can be effected during the polymerization reaction, directly after the polymerization reaction, on completion of the polymerization reaction or to the isolated product. Examples are methyl isocyanate, tolyl 4-isocyanate, butylene 3,4-diisocyanate, pentane 1,5-diisocyanate, hexamethylene 1,6-diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof with any isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homo logs (polymeric MDI), 1,3- and/or 1,4-bis(2-isocyanatoprop-2-yl)benzene (TMXDI), 1,3-bis(isocyanatomethyl)benzene (XDI), and alkyl 2,6-diisocyanatohexanoates (lysine diisocyanates) having $C_1$ to $C_6$-alkyl groups. Preference is given here to methyl isocyanate, tolyl 4-isocyanate, HDI, TDI and MDI, and also isocyanate prepolymers which result from the reaction of polyether polyols with diisocyanates, for example MDI or TDI. If appropriate, the stabilization is effected in the presence of a further catalyst which catalyzes the reaction of OH groups with isocyanates. Suitable catalysts are, for example, dibutyltin dilaurate (DBTL), tin(II) dialkoxides, tin(II) dicarboxylates, tin(II) dihalides, lithium molybdate, molybdenum dioxydi(acetylacetonate), gallium tris(acetylacetonate), bismuth tris(2-ethylhexanoate), lithium orthovanadate, vanadium(V) oxy triethoxide, vanadium(V) oxy tripropoxide, vanadium(V) oxy triisopropoxide or vanadium(V) oxy tris (acetylacetonate).

After the reaction of the nonalternating formaldehyde/$CO_2$ copolymers with carboxylic anhydrides, organic carbonates or organic isocyanates, before or after any pressure present has been released, it is possible to deactivate the excess unreacted carboxylic anhydrides, organic carbonates or organic isocyanates present in the reaction mixture, and optionally the catalyst, for example by means of water, aqueous bases, for example alkali metal or alkaline earth metal hydroxide, alkali metal carbonate or alkali metal hydrogencarbonate, alkali metal alkoxide, alkali metal carboxylate or aqueous ammonia solution, aqueous buffer solutions containing mixtures of carbonate and/or phosphate salts in combination with one or more hydrogencarbonate, phosphate, hydrogenphosphate and/or dihydrogenphosphate salts, or alcohols, amines or mixtures of two or more of the aforementioned components.

The nonalternating formaldehyde/$CO_2$ copolymer is generally isolated by releasing the excess pressure, decanting off the product phase or filtering off the solid constituents, optionally after addition of a suitable solvent, and removing the volatile components, for example by vacuum distillation. Additional purifying steps, for example for removal of the catalysts, are likewise included as well.

In the resultant nonalternating formaldehyde/$CO_2$ copolymers of the invention, the molar ratio of formaldehyde to $CO_2$ units may be between >1:1 and 30:1, preferably between 1.5:1 and 25:1 and more preferably between 2:1 and 15:1, This ratio can be determined, for example, by NMR spectroscopy or mass spectrometry. In addition, the ratio of formaldehyde to $CO_2$ units can be determined by thermal breakdown and analysis of the breakdown products, for example by elemental analysis or thermogravimetric analysis-mass spectrometry (TGA-MS).

As well as formaldehyde and $CO_2$, it is also possible for other units to be present in the polymer chain, for example oxyethylene, 2- or 3-oxypropylene, 4-oxybutylene groups, and as end groups additionally carboxylates, for example acetate, 2-(hydroxycarbonylethenyl)carboxylate, 3-(hydroxycarbonylpropyl)carboxylate, 2-(hydroxycarbonylphenyl)carboxylate groups, carbonates, for example methoxycarbonyloxy, phenoxycarbonyloxy, 2-hydroxyethoxycarbonyloxy, 2-hydroxypropyloxycarbonyloxy, 3-hydroxypropyloxycarbonyloxy, (2-hydroxy-2,3,3-trimethyl)ethoxycarbonyloxy, (2-hydroxy-2,2,3-trimethyl)ethoxycarbonyloxy groups or carbamates, for example N-methylcarbamate, 4-tolylcarbamate, 4-(4'-isocyanatophenylmethylphenyl)carbamate, 3-isocyanatophenylcarbamate, 4-isocyantatophenylcarbamate, 6-isocyanatohexylcarbamate groups.

The resultant nonalternating formaldehyde/$CO_2$ copolymers of the invention are colorless to light brown liquids or waxes and have a number-average molecular weight $M_n$ (determined by gel permeation chromatography against polymethylmethacrylate (PMMA), polypropylene glycol or polystyrene standards) of 330 to 1 000 000 g/mol, preferably 350 to 200 000 g/mol, more preferably 350 to 15 000 g/mol and most preferably 400 to 5000 g/mol.

In a preferred embodiment, the formaldehyde/$CO_2$ copolymers of the invention contain an average of 1 to 50, preferably 1 to 20 and more preferably 2 to 5 OH groups per polymer chain. This average functionality can be determined by the methods customary in polyol technology, for example by comparison of mass spectra before and after functionalization of the end groups, for example via trimethylsilylation.

The nonalternating formaldehyde/$CO_2$ copolymers obtainable by the process of the invention have a low content of by-products and can be processed without any problem, especially by reaction with di- and/or polyisocyanates to give polyurethanes, especially flexible polyurethane foams. For polyurethane applications, preference is given to using nonalternating formaldehyde/$CO_2$ copolymers having a functionality of at least 2. In addition, the nonalternating formaldehyde/$CO_2$ copolymers of the invention can be used as plastic materials, optionally after addition of further additives, for example in applications in the polyoxymethylene sector. Furthermore, the nonalternating formaldehyde/$CO_2$ copolymers obtainable by the process of the invention can be used in applications such as washing and cleaning composition formulations, drilling fluids, fuel additives, ionic and nonionic surfactants, lubricants, process chemicals for papermaking or textile manufacture, or cosmetic formulations. The person skilled in the art is aware that, depending on the respective field of use, the nonalternating formaldehyde/$CO_2$ copolymers to be used have to fulfill certain physical properties, for example molecular weight, viscosity, functionality and/or hydroxyl number.

EXAMPLES

The invention is illustrated in more detail by the figures and examples which follow, but without being restricted thereto.

The following compounds were used as formaldehyde source:
Paraformaldehyde (Aldrich) [30525-89-4]: Aldrich (Cat. No. 16005)
Paraformaldehyde (Acres Organics) [30525-89-4]: Acros Organics (Cat. No, 436780)

The calculation of the formaldehyde equivalents $n(CH_2O)$ present in mol was made (neglecting the content of end groups) according to $n(CH_2O)=m(paraformaldehyde)/30.03$ g/mol, where m(paraformaldehyde) is the mass of paraformaldehyde used in g.

The following compounds were used as Lewis-acidic component:
Sn cat. 1: dibutyltin dilaurate (DBTL) [77-58-7], Aldrich (Cat. No. 291234), 95%
Sn cat. 2: tin(II) diacetate [638-39-1], Aldrich (Cat. No. 345164)
Sn cat. 3: Borchi® Kat 28, OMG Borchers GmbH, contains tin bis(2-ethylhexanoate) [301-10-0]; tin content 28.0%-29.3%
Bi cat. 1: Borchi® Kat 24, OMG Borchers GmbH, contains 65%-85% bismuth tris(2-ethylhexanoate) [67874-71-9]
Zn cat. 1: Borchi® Kat 22, OMG Borchers GmbH, contains 100% zinc bis(2-ethylhexanoate) [85203-81-2]
Cu cat. 1: Soligen® Copper 8, OMG Borchers GmbH, contains 20%-40% copper bis(2-ethylhexanoate) [22221-10-9] and 20%-40% copper naphthenate [1338-02-9]; copper content 7.8%-8.2%

The following compounds were used as basic component:
Base 1: cesium carbonate ($Cs_2CO_3$) [534-17-8], Aldrich (Cat. No. 441902), ReagentPlus®, 99%
Base 2: 1,4-diazabicyclo[2.2.2]octane (DABCO) [280-57-9]; Sigma-Aldrich (Cat. No. D27802), ReagentPlus®, ≥99.0%

The following compounds were used as stabilizing reagent:
acetic anhydride [108-24-7]: Sigma-Aldrich (Cat. No. 320102), ReagentPlus®, ≥99%

DESCRIPTION OF THE METHODS

The molar mass distributions were determined by means of gel permeation chromatography (GPC), Gel permeation chromatography (GPC): The measurements with DMF as eluent were effected on the Agilent 1200 Series instrument, eluent: 1 g/L LiBr in DMF (UV/IR grade), stored under $N_2$; flow rate; 1.0 mL/min; autosampler: Jasco 2031 plus; HPLC pump: ERC/Knauer K-1001; detector: Wellchrora RI/Visko dual detector WEG/ERC; column combination: GRAM 50×8 mm, 10 µm, 30 Å; ORAM 300×8 mm, 10 µm, 30 Å; GRAM 300×8 mm, 10 µm, 100 Å; GRAM 300×8 mm, 10 µm, 1000 Å; GRAM 300×8 mm, 30 µm, 10000 Å; degasser: ERC PL-DG802. The molecular weight calibration was effected with PMMA standards from PSS Polymer Standards Service. The measurement recording and evaluation software used was the software package "PSS WinGPC Unity", The GPC chromatograms were recorded in accordance with DIN 55672-1, except using LiBr in DMF as eluent rather than THF.

The measurements with chloroform as eluent were effected on the Agilent 1200 Series instrument (G1310A Iso Pump, G1329A ALS, G1316A TCC, G1362A RID, G1365D MWD), detection via RID; eluent: chloroform (GPC grade), flow rate 10 ml/min; column combination: PSS SDV pre-column 8×50 mm (5 µm), 2×PSS SDV linear S 8×300 mm (5 µm). Polystyrene samples of known molar mass from PSS Polymer Standards Service were used for calibration. The measurement recording and evaluation software used was the software package "PSS WinGPC Unity". The GPC chromatograms were recorded in accordance with DIN 55672-1, except using chloroform as eluent rather than THF.

The viscosity was determined on an Anton Paar Physica MCR 501 rheometer. A cone-plate configuration having a separation of 50 μm was selected (DCP25 measurement system). 0.1 g of the substance was applied to the rheometer plate and subjected to a shear of 0.01 to 1000 l/s at 25° C., and the viscosity was measured every 10 s for 10 min. The viscosity averaged over all the measurement points is reported.

OH number determination: The OH number (hydroxyl number) was determined on the basis of DIN 53240-2, except using N-methylpyrrolidone rather than THF/dichloromethane as the solvent, A 0.5 molar ethanolic KOH solution was used for titration (endpoint recognition by means of potentiometry). The test substance used was castor oil with certified OH number, The reporting of the unit in "$mg_{KOH}/g$" relates to mg[KOH]/g[product]. The OH number is related to the equivalent molar mass according to the following equation:

$$\text{OH number } [mg_{KOH}/g]=56100\ [mg_{KOH}/\text{mol}]/\text{equivalent molar mass [g/mol]}$$

The equivalent molar mass is understood to mean the number-average total molar mass of the material containing active hydrogen atoms divided by the number of active hydrogen atoms (functionality), Infrared (IR) spectroscopy: The measurements were effected on a Bruker Alpha-P FT-IR spectrometer. The measurements were effected in neat form. Signal intensities: vs=very strong (90-100% absorbance), s=strong (70-90% absorbance), m=medium (30-70% absorbance), w=weak (10-30% absorbance), vw=very weak (0-10% absorbance); b=broadened band, $^1$H NMR spectroscopy; The measurements were effected on the Bruker AV400 (400 MHz) or Bruker AV600 (600 MHz) instrument. The chemical shifts were calibrated relative to the solvent signal (DMSO-d$^6$, δ=2.50 ppm or CDCl$_3$, δ=7.14 ppm); s=singet, m=multiplet, bs=broadened singlet. The area integrals of the individual $^1$H signals were reported relative to one another.

$^{13}$C NMR spectroscopy: The measurements were effected on the Bruker AV400 (400 MHz) or Bruker AV600 (600 MHz) instrument. The chemical shifts were calibrated relative to the solvent signal (DMSO-d$^6$, δ=39.52 ppm or CDCl$_3$, δ=77.16 ppm). APT (attached proton test): CH$_2$, C$_{quart}$: positive signal (+); CH, CH$_3$: negative signal (−). HMBC: Hetero multiple bond correlation. HSQC: Heteronuclear single-quantum correlation.

Electrospray mass spectrometry (ESI-MS): The measurements were effected on the Thermo Fisher Scientific LTQ Orbitrap XL instrument; the samples were dissolved in DMSO and diluted with MeOH.

ICP-OES (inductively coupled plasma optical emission spectroscopy): The sample was dissolved by means of microwave digestion (MarsXpress from CEM Mikrowellentechnik) at a temperature of 180° C. with nitric acid in a Teflon vessel and then analyzed by means of ICP-OES on the Spectro Syros Vision instrument.

Example 1

Preparation of a Formaldehyde/CO$_2$ Copolymer with Paraformaldehyde, Sn Cat. 1 (DBTL) and Base 1 (Cesium Carbonate)

A 200 mL stainless steel reactor was initially charged with 15.14 g (corresponding to 0.504 mol of formaldehyde equivalents) of paraformaldehyde (Aldrich), 1.66 g (5.09 mmol) of base 1 (Cs$_2$CO$_3$) and 12.8 mg (0.02 mmol) of Sn cat. 1 (DBTL). Then 40 ml of 1,4-dioxane were added. Subsequently, carbon dioxide was injected to 10 bar (absolute) and the reaction mixture was heated to 120° C. On attainment of the temperature of 120° C., the gauge pressure was adjusted to 30 bar (absolute) with carbon dioxide and the reaction mixture was stirred at 500 rpm with a sparging stirrer at 120° C. for 16 h. After cooling to 25° C., the elevated pressure was released, A biphasic mixture was obtained. The upper, low-viscosity phase was removed and the viscous product phase was dried at 2×10$^{-3}$ bar for three hours. 7.07 g of a viscous, colorless oil were obtained.

Unlike the paraformaldehyde starting material, the product is soluble in DMF and DMSO.

By means of gel permeation chromatography (GPC) against PMMA standards with DMF as eluent, a mean molecular weight $M_n$=407 g/mol and a polydispersity index PDI=1.27 were determined.

IR: ν=3321 (b, w, ν[OH]), 2888 (w, ν[CH$_2$]), 1772 (vw, ν[C=O]), 1591 (w), 1411 (vw), 1380 (vw), 1347 (vw), 1290 (vw), 1256 (vw), 1113 (w), 1017 (m), 869 (w), 614 (w) cm$^{-1}$.

$^1$H-NMR (400 MHz, DMSO-d$^6$): δ=1.66 (s, 0.006H), 3.16 (s, 0.015H), 3.20 (s, 0.034H), 3.24 (s, 0.01H), 3.31 (s, 0.052H), 3.39-3.56 (m, 1.00H), 3.75 (s, 0.025) 4.03-4.22 (m, 0.033H), 4.32-4.42 (m, 0.007H), 4.52-4.78 (m, 0.399H), 8.44 (bs, 0.024H) ppm.

$^{13}$C APT NMR (125 MHz. DMSO-d$^6$): δ=24.8 (+), 53.8 (+), 59.6 (+), 59.8 (+), 60.0 (+), 61.5 (+), 62.1 (+), 62.3 (+), 62.7 (+), 62.8 (+), 62.9 (+), 63.0 (+), 63.7 (+), 64.2 (+), 66.3 (+), 67.9 (−), 68.1 (+), 68.7 (+), 68.9 (+), 69.0 (+), 70.4 (+), 71.7 (−), 71.8 (−), 72.2 (−), 73.5 (+), 74.0 (+), 76.4 (−), 76.4 (−), 76.5 (+), 81.9 (+), 83.7 (+), 84.7 (+), 84.9 (+), 88.8 (+), 89.0 (+), 89.1 (+), 89.3 (+), 90.8 (+), 90.9 (−), 91.6 (+), 166.7 (−), 175.3 (+), 175.5 (+) ppm.

By means of HMBC-NMR spectroscopy, long-range coupling to a $^1$H signal at 3.75 ppm was observed for the $^{13}$C signal at 175.3. By means of HSQC-NMR spectroscopy, this $^1$H signal can be attributed to the positive $^{13}$C signal (CH$_2$ group) at 62.1 ppm. In addition, the $^1$H signal at 3.75 ppm, according to HMBC-NMR spectroscopy, exhibits further long-range couplings to positive $^{13}$C signals at 66.3 and 69.0 ppm (CH$_2$ groups), which in turn are assigned by HSQC-NMR spectroscopy to $^1$H signals at 3.58 and 3.68 ppm. It has thus been shown that the $^{13}$C signal at 175.3 ppm has long-range couplings to a sequence of 3 methylene units. Thus, a nonalternating formaldehyde/CO$_2$ copolymer is present.

ESI-MS (FTMS+p ESI):

The simultaneous presence of CO$_2$ and formaldehyde units is shown in the ESI mass spectrum by the following mass signals:

M1: m/z=609.11582
M2: m/z=639.12654
M3: m/z=653.10595
M4: m/z=683.11608

The extension of the chain in M1 by one formaldehyde unit leads to M2 (Δm=30.01072 amu, calc.: Δm(CH$_2$O) =30.01056 amu), and the extension of M1 by one CO$_2$ unit to M3 (Δm=43.99013 amu, calc.: Δm(CO$_2$)=43.98983 amu). The extension of M1 by one CO$_2$ and one formaldehyde unit each leads to M4 (Δm=74.00026 amu, calc.: Δm(CH$_2$O+ CO$_2$)=74.00039 amu), It has thus been shown that M4 is derived from M1 by extension by one formaldehyde and one CO$_2$ unit, and thus contains at least one formaldehyde and one CO$_2$ unit.

In addition, the following mass signals were identified in the ESI mass spectrum:

m/z=

745.1539 [$(CH_2O)_{18}(CO_2)_4CHO^+$, calc.: 745.1522],
715.1431 [$(CH_2O)_{17}(CO_2)_4CHO^+$, calc.: 715.1417],
685.1324 [$(CH_2O)_{16}(CO_2)_4CHO^+$, calc.: 685.1311],
655.1216 [$(CH_2O)_{15}(CO_2)_4CHO^+$, calc.: 655.1205],
625.1110 [$(CH_2O)_{14}(CO_2)_4CHO^+$, calc.: 625.1110],
595.1002 [$(CH_2O)_{13}(CO_2)_4CHO^+$, calc.: 595.0994],
565.0896 [$(CH_2O)_{12}(CO_2)_4CHO^+$, calc.: 565.0888],
535.0788 [$(CH_2O)_{11}(CO_2)_4CHO^+$, calc.: 535.0783], The resultant high-resolution mass signals show that nonalternating formaldehyde/$CO_2$ copolymers having a formaldehyde: $CO_2$ ratio >1:1 are present.

Example 2

Preparation of a Formaldehyde/$CO_2$ Copolymer with Paraformaldehyde, Sn Cat. 1 (DBTL) and Base 1 (Cesium Carbonate)

A 200 mL stainless steel reactor was initially charged with 15.12 g (corresponding to 0.504 mol of formaldehyde equivalents) of paraformaldehyde (Aldrich), 1.63 g (4.99 mmol) of base 1 ($Cs_2CO_3$) and 30.0 mg (0.047 mmol) of Sn cat. 1 (DBTL). Then 40 ml of 1,4-dioxane were added. Subsequently, carbon dioxide was injected to 10 bar (absolute) and the reaction mixture was heated to 120° C. On attainment of the temperature of 120° C., the gauge pressure was adjusted to 30 bar (absolute) with carbon dioxide and the reaction mixture was stirred at 500 rpm with a sparging stirrer at 120° C. for 16 h. After cooling to 25° C., the elevated pressure was released. A biphasic mixture was obtained. The upper, low-viscosity phase was removed and the viscous product phase was dried at $2\times10^{-3}$ bar for three hours. 6.85 g of a viscous, brown oil were obtained.

Unlike the paraformaldehyde starting material, the product is soluble in DMF and DMSO.

OH number: 157.9 $mg_{KOH}$/g. This corresponds to an equivalent weight of 355.4 g/mol OH.

IR: $\nu$=3320 (b, w, v[OH]), 2894 (w, v[$CH_2$]), 1766 (vw, v[C=O]), 1716 (w), 1590 (w), 1408 (vw), 1351 (vw), 1292 (vw), 1255 (vw), 1116 (w), 1033 (m), 869 (w), 613 (w) $cm^{-1}$.

$^1$H-NMR (400 MHz, DMSO-$d^6$): δ=1.82 (s, 0.008H), 1.98-(m, 0.009H), 2.10-2.35 (m, 0.011H), 3.16 (s, 0.034H), 3.31 (s, 0.092H), 3.40-3.54 (m, 1.00H), 4.04 (s, 0.012H), 4.06 (s, 0.018H), 4.16 (s, 0.014H), 4.18 (s, 0.013H), 4.35 (s, 0.030H), 4.59 (bs, 0.637H), 8.17 (s, 0.001H), 8.44 (bs, 0.014H) ppm.

$^{13}$C APT NMR (125 MHz, DMSO-$d^6$): δ=48.9 (+), 49.8 (+), 60.0 (+), 60.4 (+), 61.6 (+), 62.1 (+), 63.08 (+), 64.2 (+), 64.6 (+), 66.6 (+), 68.4 (−), 68.6 70.3 (−), 70.5 (−), 72.5 (−), 74.7 (+), 76.7 (−), 167.1 (−), 176.3 (+), 177.5 (+) ppm.

Examples 1 and 2 show that, during the reaction, repolymerization of the insoluble paraformaldehyde took place to give a soluble oligomeric product, in the IR spectrum of the product, neither the typical signals at 1236, 1089, 904, 629 and 453 $cm^{-5}$ for paraformaldehyde nor at 1716, 1328, 876 and 673 $cm^{-1}$ for cesium carbonate were observed.

The incorporation of $CO_2$ into the polymer was demonstrated by the characteristic signal in the IR spectrum at 1772 $cm^{-1}$ (example 1) or 1766 $cm^{-1}$ (example 2) and the characteristic signals in the $^{13}$C APT NMR spectrum at δ=175.3, 175.5 (+, $C_{quart}$, example 1) and 176.3, 177.5 (+, $C_{quart}$, example 2), The occurrence of several signals in the $^{13}$C NMR spectrum indicates a variable environment for the incorporated $CO_2$ groups and hence a nonalternating polymer. By HMBC-NMR spectroscopy and HSQC-NMR spectroscopy, it was demonstrated for example 1 that the quaternary signal at δ=175.3 ppm in the $^{13}$C NMR spectrum is connected via long-range couplings to a sequence consisting of three different methylene groups. This is evidence for the presence of a nonalternating copolymer.

In addition, the ESI-MS spectrum in example 1 demonstrates the presence of oligomers having different contents of $CO_2$ units (Δm=43.98983 amu) and $CH_2O$ units (Δm=30.01056 amu). In addition, the elemental composition of the mass signals shows that a nonalternating formaldehyde/$CO_2$ polymer is present.

The OH number in example 2 and the broad OH band at 3321 $cm^{-1}$ (example 1) or 3320 $cm^{-1}$ (example 2) in the IR spectrum show the presence of terminal OH groups, which enables the use of the product as a polyol unit in polyurethanes.

Example 3

Preparation of an Acylated Formaldehyde/$CO_2$ Copolymer with Paraformaldehyde, Sn Cat. 1 (DBTL) and Base 1 (Cesium Carbonate) (Ratio of Base:Formaldehyde Equivalents=1:94)

A 200 mL stainless steel reactor was initially charged with 15.15 g (corresponding to 0.504 mol of formaldehyde equivalents) of paraformaldehyde (Aldrich), 1.74 g (5.34 mmol) of base 1 ($Cs_2CO_3$) and 10.1 mg (0.016 mmol) of Sn cat. 1 (DBTL). Then 40 ml of 1,4-dioxane were added. Subsequently, carbon dioxide was injected to 10 bar (absolute) and the reaction mixture was heated to 120° C. On attainment of the temperature of 120° C., the gauge pressure was adjusted to 30 bar (absolute) with carbon dioxide and the reaction mixture was stirred at 500 rpm with a sparging stirrer at 120° C. for 16 h. After cooling to 25° C., 30 mL of acetic anhydride were metered in at a flow rate of 1 mL/min with an HPLC pump while stirring. On completion of addition, the reaction mixture was heated to 60° C. while stirring at 500 rpm and stirred at 60° C. for 3 h. Thereafter, the reactor was cooled to 25° C. and the elevated pressure was released, The resultant colorless homogeneous product mixture was transferred to a beaker and saturated sodium carbonate solution was added dropwise until a pH of the solution of >7 was attained. The mixture thus obtained was transferred into a separating funnel and the product was extracted with 4×50 mL of dichloromethane. After the volatile constituents had been removed under reduced pressure, 9.95 g of a pale yellow oil were obtained as residue.

Unlike the paraformaldehyde starting material, the product is soluble in dichloromethane and chloroform.

Viscosity: 0.292 Pa·s

By means of gel permeation chromatography (GPC) against polystyrene standards with chloroform as eluent, a mean molecular weight $M_n$=644 g/mol and a polydispersity index PDI=3.23 were determined.

IR: $\nu$=3481 (b, w, v[OH]), 2959 (w, v[$CH_2$]), 2904 (w, v[$CH_2$]), 737 (s, v[C=O]), 1466 (w), 1432 (w), 1368 (m), 1224 (s), 1197 (s), 1358 (m), 1112 (m), 1043 (m), 1010 (s), 946 (s), 834 (w), 605 (w), 515 (vw) $cm^{-1}$.

$^1$H-NMR (400 MHz, $CDCl_3$): δ=1.80 (bs, 1.00H, $CH_3$), 1.81 (bs, 0.81H, $CH_3$), 3.08 (s, 0.091H), 3.09 (s, 0.065H), 3.16-4.23 (m, 1.26H), 4.31-4.69 (m, 0.47H, O—$CH_2$—O), 4.84-5.20 (m, 0.63H, O—$CH_2$O), 5.42 (s, 0.12H, O—$CH_2$—O) ppm.

$^{13}$C APT NMR (400 MHz, $CDCl_3$): δ=19.9 (−, $CH_3$), 20.0 (−, $CH_3$), 20.2 (−, $CH_3$), 55.1 (−), 64.2 (+), 70.1 (−), 70.4 (+), 71.5 (+), 72.0 (+), 75.1 (+), 77.1 (+), 78.6 (+, O—$CH_2$O), 84.6 (+, O—$CH_2$O), 84.9 (+, O—$CH_2$—O), 86.3 (+,

O—CH$_2$O), 88.1 (+, O—CH$_2$—O), 88.5 (+, O—CH$_2$—O), 89.6 (+, O—CH$_2$—O), 90.1 (+, O—CH$_2$—O), 92.9 (+, O—CH$_2$—O), 94.5 (+, O—CH$_2$—O), 169.0 (+, C═O), 169.5 (+, C═O), 169.8 (+, C═O), 169.8 (+, C═O), 170.0 (+, C═O), 170.1 (+, C═O) ppm.

ESI-MS (FTMS+p ESI): In the ESI mass spectrum, the signal series with the greatest signal intensity identified were the following signal series, which are attributed to the following general empirical formula:

$$[H_3CCOO(CH_2O)_x(CO_2)_yCOCH_3]+H^+$$

Series 1 (y=2): m/z (%) [x CH$_2$O]=431.15155 (1.05) [8 CH$_2$O], 461.16241 (1.16) [9 CH$_2$O], 491.17294 (1.46) [10 CH$_2$O], 521.18341 (1.61) [11 CH$_2$O], 551.19348 (1.13) [12 CH$_2$O], 581.20441 (1.21) [13CH$_2$O].

Series 2 (y=3): m/z (%) [x CH$_2$O]=415.12067 (12.38) [6 CH$_2$O], 445.13120 (39.65) [7 CH$_2$O], 475.14169 (79.80) [8 CH$_2$O], 505.15222 (100) [9 CH$_2$O], 535.16284 (8318) [10 CH$_2$O], 565.17352 (45.87) [11 CH$_2$O], 595.18427 (20.73) [12 CH$_2$O], 625.19482 (7.72) [13 CH$_2$O], Series 3 (y=4): m/z (%) [x CH$_2$O]=489.12057 (0.64) [7 CH$_2$O], 519.13129 (0.92) [8 CH$_2$O], 549.14221 (0.85) [9 CH$_2$O].

The extension of the chain in series 1 by one CO$_2$ unit leads to series 2 (Δm=43.98981 amu, calc: Δm(CO$_2$) =43.98983 amu). The extension of series 2 by one CO$_2$ unit leads to series 3 (Δm=43.98999 amu, calc.: Δm(CO$_2$) =43.98983 amu).

Thus, series 1 is attributed to a nonalternating formaldehyde/CO$_2$ copolymer having 2 CO$_2$ units and 8 to 13 formaldehyde units, series 2 to a nonalternating formaldehyde/CO$_2$ copolymer having 3 CO$_2$ units and 6 to 13 formaldehyde units, and series 3 to a formaldehyde/CO$_2$ copolymer having 4 CO$_2$ units and 7 to 9 formaldehyde units. The most intense signal in the ESI mass spectrum was attributed to a formaldehyde/CO$_2$ copolymer having 3 CO$_2$ units and 9 formaldehyde units.

The relative ratio of formaldehyde units to CO$_2$ units in all chains is thus >1:1, which means that the presence of nonalternating formaldehyde/CO$_2$ copolymers has been proved beyond doubt.

Example 4

Preparation of an Acylated Formaldehyde/CO$_2$ Copolymer with Paraformaldehyde, Sn Cat. 1 (DBTL) and Base 1 (Cesium Carbonate) (Ratio of Base:Formaldehyde Equivalents=1:199)

A 200 mL stainless steel reactor was initially charged with 15.09 g (corresponding to 0.502 mol of formaldehyde equivalents) of paraformaldehyde (Acros Organics), 0.82 g (2.52 mmol) of base 1 (Cs$_2$CO$_3$) and 10.2 mg (0.016 mmol) of Sn cat. 1 (DBTL). Then 40 ml of 1,4-dioxane were added. Subsequently, carbon dioxide was injected to 10 bar (absolute) and the reaction mixture was heated to 120° C. On attainment of the temperature of 120° C., the gauge pressure was adjusted to 30 bar (absolute) and the reaction mixture was stirred at 423 rpm with a sparging stirrer at 120° C. for 16 h. After cooling to 25° C., 30 mL of acetic anhydride were metered in at a flow rate of 5 mL/min with an HPLC pump while stirring. On completion of addition, the reaction mixture was heated to 60° C. while stirring at 500 rpm and stirred at 60° C. for 3 h. Thereafter, the reactor was cooled to 25° C. and the elevated pressure was released. A colorless homogeneous mixture was obtained. The resultant product mixture was transferred to a beaker and saturated sodium carbonate solution was added dropwise until a pH of the solution of >7 was attained. The mixture thus obtained was extracted with 4×50 mL of dichloromethane. After the volatile constituents had been removed under reduced pressure, 14.82 g of a colorless oil having colorless solid particles were obtained.

Unlike the paraformaldehyde starting material, the product is soluble in dichloromethane and chloroform.

By means of gel permeation chromatography (GPC) against polystyrene standards with chloroform as eluent, a mean molecular weight M$_n$=796 g/mol and a polydispersity index PDI=1.24 were determined, IR: ν=3487 (b, vw, ν[OH]), 2973 (w, ν[CH$_2$]), 2933 (w, ν[CH$_2$]), 1743 (m, ν[C═O]), 1467 (w), 1419 (w), 1369 (w), 1225 (m), 1197 (m), 1108 (m), 1045 (w), 1006 (m), 910 (vs), 833 (w), 606 (w), 534 (vw), 455 (vw) cm$^{-1}$.

$^1$H-NMR (400 MHz, CDCl$_3$): δ=1.99-2.03 (m, 1.00H, CH$_3$), 3.29 (s, 0.17H), 3.53-3.87 (m, 0.22H), 4.63 (s, 0.11H, O—CH$_2$—O), 4.66 (s, 0.02H, O—CH$_2$—O), 4.70-4.85 (m, 0.74H, O—CH$_2$—O), 5.12-5.29 (m, 0.45H, O—CH$_2$—O), 5.62 (s, 0.08H, O—CH$_2$—O) ppm.

$^{13}$C APT NMR (400 MHz, CDCl$_3$): δ=20.6 (−, CH$_3$), 20.8 (−, CH$_3$), 55.7 (−), 55.8 (−), 79.1 (+, O—CH$_2$—O), 85.0 (+, O—CH$_2$—O), 85.4 (+, O—CH$_2$—O), 86.8 (+, O—CH$_2$—O), 88.7 (+, O—CH$_2$—O), 89.1 (+, O—CH$_2$—O), 90.1 (+, O—CH$_2$—O), 90.6 (+, O—CH$_2$-Q), 92.3 (+, O—CH$_2$—O), 93.5 (+, O—CH$_2$O), 95.0 (+, O—CH$_2$—O), 169.6 (+, C—O), 170.1 (+, C═O) ppm.

ESI-MS (FTMS+p ESI): In the ESI mass spectrum, the following signal series were identified, which are attributable to the following general empirical formula:

$$[H_3CCOO(CH_2O)_x(CO_2)_yCOCH_3]+H^+$$

Series 1 (y=1): m/z (%) [x CH$_2$O]=387.12 (2.90) [8 CH$_2$O], 417.13 (5.32) [9 CH$_2$O], 447.14 (6.76) [10 CH$_2$O], 477.15 (10.40) [11 CH$_2$O], 507.16 (9.07) [12 CH$_2$O], 537.17 (10.62) [13 CH$_2$O], 567.18 (11.18) [14 CH$_2$O], 597.19 (11.38) [15 CH$_2$O], 627.21 (11.00) [16 CH$_2$O], 657.22 (9.39) [17 CH$_2$O], 687.23 (7.88) [18 CH$_2$O], 717.24 (5.34) [19 CH$_2$O], 747.25 (4.26) [20 CH$_2$O], 777.26 (3.18) [21 CH$_2$O]).

Series 2 (y=2): m/z (%) [x CH$_2$O]=341.08 (1.33) [5 CH$_2$O], 371.09 (4.89) [6 CH$_2$O], 401.10 (12.07) [7 CH$_2$O], 431.11 (18.45) [8 CH$_2$O], 461.12 (24.03) [9 CH$_2$O], 491.13 (26.81) [10 CH$_2$O], 521.14 (27.46) [11 CH$_2$O], 551.15 (24.41) [12 CH$_2$O], 581.16 (21.62) [13 CH$_2$O], 611.17 (18.81[14 CH$_2$O]), 641.19 (16.80) [15 CH$_2$O], 671.20 (14.39) [16 CH$_2$O], 701.21 (12.01) [17 CH$_2$O], 731.22 (9.45) [18 CH$_2$O], 761.23 (7.17) [19 CH$_2$O], 791.24 (5.29) [20 CH$_2$O], 821.25 (3.67) [21 CH$_2$O]).

Series 3 (y=3): m/z (%) [x CH$_2$O]=385.11 (5.93) [5 CH$_2$O], 415.12 (15.92) [6 CH$_2$O], 445.13 (30.97) [7 CH$_2$O], 475.13 (30.97) [8 CH$_2$O], 505.15 (57.53) [9 CH$_2$O], 535.16 (72.55) [10 CH$_2$O], 565.17 (88.46) [11 CH$_2$O], 595.18 (99.41) [12 CH$_2$O], 625.19 (99.78) [13 CH$_2$O], 655.20 (100.0) [14 CH$_2$O], 685.21 (96.90) [15 CH$_2$O], 715.22 (80.16) [16 CH$_2$O], 745.23 (71.63) [17 CH$_2$O], 775.24 (55.02) [18 CH$_2$O], 805.25 (43.09) [19 CH$_2$O], 835.26 (32.39) [20 CH$_2$O], 865.27 (23.48) [21 CH$_2$O], 895.29 (17.22) [22 CH$_2$O], 925.30 (10.99) [23 CH$_2$O], 955.31 (6.73) [24 CH$_2$O], 985.32 (4.91) [25 CH$_2$O], 1015.33 (2.82) [26 CH$_2$O], Series 4 (y=4): m/z (%) [x CH$_2$O]=459.14 (5.00) [6 CH$_2$O], 489.15 (8.67) [7 CH$_2$O], 519.16 (10.59) [8 CH$_2$O], 549.17 (11.61) [9 CH$_2$O], 579.19 (13.85) [10 CH$_2$O], 609.20 (16.50) [11 CH$_2$O], 639.21 (17.48) [12 CH$_2$O], 669.22 (19.06) [13 CH$_2$O], 699.23 (19.24) [14 CH$_2$O], 729.24

(17.46) [15 CH$_2$O], 759.25 (15.88) [16 CH$_2$O], 789.26 (14.16) [17 CH$_2$O], 819.27 (11.49) [18 CH$_2$O], 849.28 (8.21) [19 CH$_2$O], 879.29 (7.79) [20 CH$_2$O], 909.31 (5.16) [21 CH$_2$O], 939.31 (3.12) [22 CH$_2$O], 969.32 (2.42) [23 CH$_2$O].

Thus, series 1 is attributed to a nonalternating formaldehyde/CO$_2$ copolymer having one CO$_2$ unit and 8 to 21 formaldehyde units, series 2 to a nonalternating formaldehyde/CO$_2$ copolymer having 2 CO$_2$ units and 5 to 21 formaldehyde units, series 3 to a nonalternating formaldehyde/CO$_2$ copolymer having 3 CO$_2$ units and 5 to 26 formaldehyde units, and series 4 to a formaldehyde/CO$_2$ copolymer having 4 CO$_2$ units and 6 to 23 formaldehyde units, The most intense signal in the ESI mass spectrum was attributed to a formaldehyde/CO$_2$ copolymer having 3 CO$_2$ units and 14 formaldehyde units.

The relative ratio of formaldehyde units to CO$_2$ units in all chains is thus >1:1, which means that the presence of nonalternating formaldehyde/CO$_2$ copolymers has been proved beyond doubt.

Example 3

Preparation of an Acylated Formaldehyde/CO$_2$ Copolymer with Paraformaldehyde, Sn Cat. 1 (DBTL) and Base 1 (Cesium Carbonate) (Ratio of Base:Formaldehyde Equivalents=1:49)

A 200 mL stainless steel reactor was initially charged with 15.11 g (corresponding to 0.503 mol of formaldehyde equivalents) of paraformaldehyde (Acros Organics), 3.31 g (10.2 mmol) of base 1 (Cs$_2$CO$_3$) and 10.1 mg (0.016 mmol) of Sn cat. 3 (DBTL). Then 40 ml of 1,4-dioxane were added, Subsequently, carbon dioxide was injected to 10 bar (absolute) and the reaction mixture was heated to 120° C. On attainment of the temperature of 120° C., the gauge pressure was adjusted to 30 bar (absolute) and the reaction mixture was stirred at 425 rpm with a sparging stirrer at 120° C. for 36 h. After cooling to 25° C., 30 mL of acetic anhydride were metered in at a How rate of 5 mL/min with an HPLC pump while stirring. On completion of addition, the reaction mixture was heated to 60° C. while stirring at 425 rpm and stirred at 60° C. for 3 h. Thereafter, the reactor was cooled to 25° C. and the elevated pressure was released, A pale yellow homogeneous mixture was obtained. The resultant product mixture was transferred to a beaker and saturated sodium carbonate solution was added dropwise until a pH of the solution of >7 was attained. The mixture thus obtained was extracted with a total of 300 mL of dichloromethane. After the volatile constituents had been removed under reduced pressure, 11.50 g of a pale yellow oil having colorless solid particles were obtained.

Unlike the paraformaldehyde starting material, the product is soluble in dichloromethane and chloroform.

By means of gel permeation chromatography (GPC) against polystyrene standards with chloroform as eluent, a mean molecular weight $M_n$=725 g/mol and a polydispersity index PDI=1.24 were determined.

IR: ν=3498 (b, vw, ν[OH]), 2959 (w, ν[CH$_2$]), 2906 (w, ν[CH$_2$]), 1742 (m, ν[C=O]), 1467 (w), 1418 (w), 1369 (w), 1225 (m), 1197 (m), 1108 (m), 1045 (w), 1007 (m), 916 (s), 833 (w), 606 (w), 537 (vw), 444 (vw) cm$^{-1}$.

$^1$H-NMR (400 MHz, CDCl$_3$): δ=1.99-2.02 (m, 1.00H, CH$_3$), 3.28-3.30 (m, 0.27H), 4.61-4.64 (m, 0.16H, O—CH$_2$—O), 4.66 (s, 0.03H, O—CH$_2$—O), 4.76-4.85 (m, 0.48H, OCH$_2$—O), 5.17-5.27 (m, 0.32H, O—CH$_2$—O), 5.63 (s, 0.09H, O—CH$_2$—O) ppm.

$^{13}$C APT NMR (400 MHz, CDCl$_3$): δ=20.6 (−, CH$_3$), 20.8 (−, CH$_3$), 55.7 (−), 55.9 (−), 79.1 (+, O—CH$_2$—O), 85.4 (+, O—CH$_2$—O), 86.8 (+, O—CH$_2$—O), 88.6 (+, O—CH$_2$—O), 88.7 (+, O—CH$_2$—O), 88.7 (+, O—CH$_2$—O), 89.0 (+, O—CH$_2$—O), 89.1 (+, O—CH$_2$—O), 90.1 (+, O—CH$_2$—O), 90.5 (+, O—CH$_2$—O), 92.3 (+, O—CH$_2$—O), 93.5 (+, O—CH$_2$—O), 95.0 (+, O—CH$_2$—O), 169.5 (+, C=O), 170.0 (+, C=O) ppm.

ESI-MS (FTMS+p ESI): In the ESI mass spectrum, the following signal series were identified, which are attributable to the following general empirical formula:

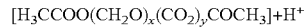

$[H_3CCOO(CH_2O)_x(CO_2)_yCOCH_3]+H^+$

Series 1 (y=1): m/z (%) [x CH$_2$O]=357.11 (4.22) [7 CH$_2$O], 387.12 (6.77) [8 CH$_2$O], 417.13 (10.16) [9 CH$_2$O], 447.14 (15.49) [10 CH$_2$], 477.15 (25.68) [11 CH$_2$O], 507.16 (14.65) [12 CH$_2$O], 537.18 (14.47) [13 CH$_2$O], 567.19 (13.08) [14 CH$_2$O], 597.20 (11.38) [15 CH$_2$O], 627.21 (9.28) [16 CH$_2$O], 657.22 (7.55) [17CH$_2$O], 687.23 (5.41) [18 CH$_2$O], 717.24 (3.60) [19 CH$_2$O], Series 2 (y=2): m/z (%) [x CH$_2$O]=341.08 (1.74) [5 CH$_2$O], 371.09 (5.29) [6 CH$_2$O], 401.10 (8.97) [7 CH$_2$O], 431.11 (16.75) [8 CH$_2$O], 461.12 (17.92) [9 CH$_2$O], 491.13 (19.85) [10 CH$_2$O], 521.14 (18.00) [11 CH$_2$O], 551.15 (15.04) [12 CH$_2$O], 581.17 (11.60) [13 CH$_2$O], 611.18 (8.82) [14 CH$_2$O], 641.19 (6.46) [15 CH$_2$O], 671.20 (5.02) [16 CH$_2$O], 701.21 (3.55) [17 CH$_2$O].

Series 3 (y=3): m/z (%) [x CH$_2$O]=385.11 (11.17) [5 CH$_2$O], 415.12 (30.37) [6 CH$_2$O], 445.13 (65.45) [7 CH$_2$O], 475.14 (78.67) [8 CH$_2$O], 505.15 (100) [9 CH$_2$O], 535.16 (95.78) [10 CH$_2$O], 565.17 (84.58) [11 CH$_2$O], 595.18 (66.99) [12 CH$_2$O], 625.19 (52.93) [13 CH$_2$O], 655.20 (41.00) [14 CH$_2$O], 685.21 (31.33) [15 CH$_2$O], 715.22 (22.64) [16 CH$_2$O], 745.23 (15.35) [17 CH$_2$O], 775.24 (9.87) [18 CH$_2$O], 805.26 (5.99) [19CH$_2$O].

Series 4 (y=4): m/z (%) [x CH$_2$O]=459.14 (13.39) [6 CH$_2$O], 489.15 (18.32) [7 CH$_2$O], 519.17 (20.79) [8 CH$_2$O], 549.18 (22.84) [9 CH$_2$O], 579.19 (24.54) [10 CH$_2$O], 609.20 (24.31) [11 CH$_2$O], 639.21 (23.66) [32 CH$_2$O], 669.22 (21.77) [13 CH$_2$O], 699.23 (18.57) [14 CH$_2$O], 729.24 (14.84) [15 CH$_2$O], 759.25 (11.47) [16 CH$_2$O], 789.26 (8.04) [17 CH$_2$O], 819.27 (5.35) [18 CH$_2$O].

Thus, series 1 can be attributed to a nonalternating formaldehyde/CO$_2$ copolymer having one CO$_2$ unit and 7 to 19 formaldehyde units, series 2 to a nonalternating formaldehyde/CO$_2$ copolymer having 2 CO$_2$ units and 5 to 17 formaldehyde units, series 3 to a nonalternating formaldehyde/CO$_2$ copolymer having 3 CO$_2$ units and 5 to 19 formaldehyde units, and series 4 to a formaldehyde/CO$_2$ copolymer having 4 CO$_2$ units and 6 to 38 formaldehyde units. The most intense signal in the ESI mass spectrum was attributed to a formaldehyde/CO$_2$ copolymer having 3 CO$_2$ units and 9 formaldehyde units.

The relative ratio of formaldehyde units to CO$_2$ units in all chains is thus >1:1, which means that the presence of nonalternating formaldehyde/CO$_2$ copolymers has been proved beyond doubt.

Example 6

Preparation of an Acylated formaldehyde/CO$_2$ copolymer with Paraformaldehyde, Sn Cat. 1 (DBTL) and Base 1 (Cesium Carbonate) (Ratio of Base:Formaldehyde Equivalents=1:20)

A 200 mL stainless steel reactor was initially charged with 15.00 g (corresponding to 0.500 mol of formaldehyde equivalents) of paraformaldehyde (Acros Organics), 8.20 g (25.2 mmol) of base 1 ($Cs_2CO_3$) and 10.2 mg (0.016 mmol) of Sn cat. 1 (DBTL). Then 40 ml of 1,4-dioxane were added. Subsequently, carbon dioxide was injected to 10 bar (absolute) and the reaction mixture was heated to 120° C., On attainment of the temperature of 120° C., the gauge pressure was adjusted to 30 bar (absolute) and the reaction mixture was stirred at 431 rpm with a sparging stirrer at 120° C. for 16 h. After cooling to 25° C., 30 mL of acetic anhydride were metered in at a flow rate of 5 mL/min with an HPLC pump while stirring. On completion of addition, the reaction mixture was heated to 60° C. while stirring at 431 rpm and stirred at 60° C. for 3 h. Thereafter, the reactor was cooled to 25° C. and the elevated pressure was released. A colorless inhomogeneous mixture consisting of a colorless liquid and colorless solid particles was obtained, The resultant product mixture was transferred to a beaker and saturated sodium carbonate solution was added dropwise until a pH of the solution of >7 was attained. The mixture thus obtained was extracted with dichloromethane. After the volatile constituents had been removed under reduced pressure, 10.58 g of a colorless oil having colorless solid particles were obtained.

Unlike the paraformaldehyde starting material, the product is soluble in dichloromethane and chloroform.

By means of gel permeation chromatography (GPC) against polystyrene standards with chloroform as eluent, a mean molecular weight $M_n$=716 g/mol and a polydispersity index PDI=1.30 were determined.

IR: v=3480 (b, vw, v[OH]), 2970 (w, v[$CH_2$]), 2913 (w, v[$CH_2$]), 1744 (m, v[C=O]), 1575 (vw), 1467 (w), 1425 (w), 1369 (w), 1225 (m), 1197 (m), 1108 (m), 1044 (w), 1007 (m), 913 (s), 833 (w), 606 (w), 533 (vw), 457 (vw) $cm^{-1}$.

$^1$H-NMR (400 MHz, $CDCl_3$ δ=2.00-2.03 (m, 1.00H, $CH_3$), 3.29-3.32 (m, 0.40H), 4.62-4.65 (m, 0.23H, O—$CH_2$—O), 4.67 (s, 0.05H, O—$CH_2$—O), 4.77-4.86 (m, 0.57H, O$CH_2$—O), 5.18-5.29 (m, 0.35H, O—$CH_2$—O), 5.64 (s, 0.09 H, O—$CH_2$—O) ppm.

$^{13}$C APT NMR (400 MHz, $CDCl_3$): δ=20.6 (−, $CH_3$), 20.9 (−, $CH_3$), 55.7 (−), 55.8 (−), 79.1 (+, O—$CH_2$—O), 85.1 (+, O—$CH_2$—O), 85.5 (+, O—$CH_2$—O), 86.8 (+, O$CH_2$O), 88.7 (+, O$CH_2$—O), 89.1 (+, O—$CH_2$—O), 90.1 (+, O—$CH_2$—O), 90.6 (+, O—$CH_2$—O), 93.5 (+, O—$CH_2$—O), 95.00 (+, O—$CH_2$—O), 169.6 (+, C=O), 170.3 (+, C=O), 170.3 (+, C=O) ppm.

ESI-MS (FTMS+p ESI): In the ESI mass spectrum, the following signal series were Identified, which are attributable to the following general empirical formula:

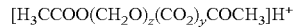

$[H_3CCOO(CH_2O)_z(CO_2)_yCOCH_3]H^+$

Series 1 (y=1): m/z (%) [x $CH_2O$]=357.13 (0.63) [7 $CH_2O$], 387.12 (3.25) [8 $CH_2O$], 417.13 (10.34) [9 $CH_2O$], 447.14 (17.12) [10 $CH_2O$], 477.35 (22.51) [11 $CH_2O$], 507.16 (22.09) [12 $CH_2O$], 537.17 (20.09) [13 $CH_2O$], 567.18 (16.04) [14 $CH_2O$], 597.20 (10.19) [15 $CH_2O$], 627.21 (6.66) [16 $CH_2O$], 657.22 (4.62) [17 $CH_2O$], 687.23 (2.21) [18 $CH_2O$].

Series 2 (y=2): m/z (%) [x $CH_2O$]=401.10 (2.90) [7 $CH_2O$], 431.11 (6.82) [8 $CH_2O$], 461.12 (10.31) [9 $CH_2O$], 491.13 (11.45) [10 $CH_2O$], 491.13 (11.45) [13 $CH_2O$], 521.14 (9.45) [12 $CH_2O$], 551.35 (6.60) [13 $CH_2O$], 581.16 (4.23) [14 $CH_2O$], 611.17 (2.24) [15 $CH_2O$].

Series 3 (y=3): m/z (%) [x $CH_2O$]=385.11 (3.55) [5 $CH_2O$], 415.12 (5.77) [6 $CH_2O$], 445.13 (24.39) [7 $CH_2O$], 475.14 (51.52) [8 $CH_2O$], 505.15 (79.51) [9 $CH_2O$], 535.16 (71.81) [30 $CH_2O$], 565.17 (60.62) [13 $CH_2O$], 595.18 (38.20) [12 $CH_2O$], 625.19 (23.80) [13 $CH_2O$], 655.20 (14.37) [14 $CH_2O$], 685.23 (7.29) [15 $CH_2O$], 715.22 (4.04) [16 $CH_2O$], 745.23 (1.79) [17 $CH_2O$], 775.24 (0.87) [18 $CH_2O$].

Series 4 (y=4): m/z (%) [x $CH_2O$]=459.14 (6.29) [6 $CH_2O$], 489.15 (9.74) [7 $CH_2O$], 519.16 (31.20) [8 $CH_2O$], 549.17 (15.39) [9 $CH_2O$], 579.19 (15.48) [10 $CH_2O$], 609.20 (14.23) [11 $CH_2O$], 639.21 (11.36) [12 $CH_2O$], 669.22 (8.56) [13 $CH_2O$], 699.23 (6.03) [14 $CH_2O$], 729.24 (3.76) [15 $CH_2O$], 759.25 (1.98) [16 ($CH_2O$), 789.26 (1.41) [17 $CH_2O$].

Thus, series 1 can be attributed to a nonalternating formaldehyde/$CO_2$ copolymer having one $CO_2$ unit and 7 to 18 formaldehyde units, series 2 to a nonalternating formaldehyde/$CO_2$ copolymer having 2 $CO_2$ units and 7 to 15 formaldehyde units, series 3 to a nonalternating formaldehyde/$CO_2$ copolymer having 3 $CO_2$ units and 5 to 18 formaldehyde units, and series 4 to a formaldehyde/$CO_2$ copolymer having 4 $CO_2$ units and 6 to 37 formaldehyde units.

The relative ratio of formaldehyde units to $CO_2$ units in all chains is thus >1:1, which means that the presence of nonalternating formaldehyde/$CO_2$ copolymers has been proved beyond doubt.

Examples 3 to 6 show that, in the case of different ratios of the basic component (=base) to formaldehyde (base: formaldehyde equivalents=1:199 in example 4 to 1:20 in example 6), formaldehyde/$CO_2$ copolymers of the invention are obtained.

Example 7

Preparation of an Acylated Formaldehyde/$CO_2$ Copolymer with Paraformaldehyde, Sn Cat. 1 (Tin(II) and Base 1 (Cesium Carbonate)

A 200 mL stainless steel reactor was initially charged with 15.14 g (corresponding to 0.504 mol of formaldehyde equivalents) of paraformaldehyde (Acros Organics), 1.65 g (5.06 mmol) of base 1 ($Cs_2CO_3$) and 4.1 mg (0.017 mmol) of Sn cat. 2 (tin(II) acetate). Then 40 ml of 1,4-dioxane were added. Subsequently, carbon dioxide was injected to 20 bar (absolute) and the reaction mixture was heated to 120° C. On attainment of the temperature of 120° C., the gauge pressure was adjusted to 32 bar (absolute) and the reaction mixture was stirred at 500 rpm with a sparging stirrer at 120° C. for 16 h, After cooling to 25° C., 30 ml, of acetic anhydride were metered in at a flow rate of 5 mL/min with an HPLC pump while stirring. On completion of addition, the reaction mixture was heated to 60° C. while stirring at 500 rpm and stirred at 60° C. for 3 h. Thereafter, the reactor was cooled to 25° C. and the elevated pressure was released. A colorless Inhomogeneous mixture consisting of liquid and solid constituents was obtained. The resultant product mixture was transferred to a beaker and saturated sodium carbonate solution was added dropwise until a pH of the solution of >7 was attained. The mixture thus obtained was filtered through a paper filter and the filtrate was extracted with 4×50 mL of dichloromethane, After the volatile constituents had been removed under reduced pressure, 3.07 g of a colorless oil were obtained.

Unlike the paraformaldehyde starting material, the product is soluble in dichloromethane and chloroform.

By means of gel permeation chromatography (GPC) against polystyrene standards with chloroform as eluent, a mean molecular weight $M_n$=639 g/mol and a polydispersity index PDI=1.08 were determined.

IR: ν=2975 (vw, ν[CH$_2$]), 2918 (vw, ν[CH$_2$]), 1747 (m, ν[C=O]), 1573 (vw), 1426 (w), 1369 (w), 122.4 (m), 1195 (m), 1145 (w), 1111 (w), 1046 (w), 1006 (m), 980 (m), 918 (s), 831 (w), 605 (w), 520 (vw), 456 (w) cm$^{-1}$.

$^1$H-NMR (400 MHz, CDCl$_3$): δ=2.01-2.06 (m, 1.00H, CH$_3$), 3.31-3.35 (m, 0.11H), 4.64-4.69 (m, 0.08H, O—CH$_2$—O), 4.79-4.89 (m, 0.36H, O—CH$_2$—O), 5.25-5.33 (m, 0.40H, O—CH$_2$—O), 5.70 (s, 0.12H, O—CH$_2$—O) ppm.

$^{13}$C APT NMR (400 MHz, CDCl3); δ=20.7 (−, CH$_3$), 20.9 (−, CH$_3$), 55.8 (−), 55.9 (−), 79.2 (+, O—CH$_2$O), 85.5 (+, O—CH$_2$—O), 86.9 (+, O—CH$_2$—O), 88.7 (+, O—CH$_2$—O), 88.8 (+, O—CH$_2$—O), 89.2 (+, O—CH$_2$—O), 90.2 (+, O—CH$_2$—O), 90.7 (+, O—CH$_2$—O), 90.7 (+, O—CH$_2$—O), 92.4 (+, O—CH$_2$—O), 93.6 (+, O—CH$_2$—O), 169.7 (+, C=O), 170.2 (+, C=O) ppm.

ESI-MS (FTMS+p ESI): In the ESI mass spectrum, the following signal series were identified, which are attributable to the following general empirical formula:

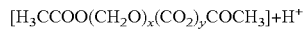

[H$_3$CCOO(CH$_2$O)$_x$(CO$_2$)$_y$COCH$_3$]+H$^+$

Series 1 (y=1): m/z (%) [x CH$_2$O]=387.12 (0.85) [8 CH$_2$O], 417.13 (1.04) [9 CH$_2$O], 447.14 (1.39) [10 CH$_2$O], 477.15 (1.05) [11 CH$_2$O], 507.16 (0.78) [12 CH$_2$O], 537.17 (0.53) [13 CH$_2$O], Series 2 (y=2): m/z (%) [x CH$_2$O]=341.08 (1.80) [5 CH$_2$O], 371.09 (3.41) [6 CH$_2$O], 401.10 (4.12) [7 CH$_2$O], 431.11 (5.23) [8 CH$_2$O], 461.12 (6.87) [9 CH$_2$O], 491.13 (5.09) [10 CH$_2$O], 521.14 (2.31) [11 CH$_2$O], 551.15 (0.83) [12CH$_2$O].

Series 3 (y=3): m/z (%) [x CH$_2$O]=385.11 (4.56) [5 CH$_2$O], 415.12 (4.98) [6 CH$_2$O], 445.13 (16.03) [7 CH$_2$O], 475.14 (14.29) [8 CH$_2$O], 505.15 (14.60) [9 CH$_2$O], 535.16 (11.00) [10 CH$_2$O], 565.17 (5.99) [11 CH$_2$O], 595.18 (2.83) [12 CH$_2$O].

Series 4 (y=4): m/z (%) [x CH$_2$O]=459.14 (1.37) [6 CH$_2$O], 489.15 (1.44) [7 CH$_2$O], 519.16 (2.44) [8 CH$_2$O], 549.18 (2.18) [9 CH$_2$O], 579.19 (2.36) [30 CH$_2$O], 609.20 (1.25) [11 CH$_2$O], 639.21 (0.69) [12 CH$_2$O].

Thus, series 1 can be attributed to a nonalternating formaldehyde/CO$_2$ copolymer having one CO$_2$ unit and 8 to 13 formaldehyde units, series 2 to a nonalternating formaldehyde/CO$_2$ copolymer having 2 CO$_2$ units and 5 to 32 formaldehyde units, series 3 to a nonalternating formaldehyde/CO$_2$ copolymer having 3 CO$_2$ units and 5 to 12 formaldehyde units, and series 4 to a formaldehyde/CO$_2$ copolymer having 4 CO$_2$ units and 6 to 12 formaldehyde units.

The relative ratio of formaldehyde units to CO$_2$ units in all chains is thus >1:1, which means that the presence of nonalternating formaldehyde/CO$_2$ copolymers has been proved beyond doubt.

Example 8

Preparation of an Acylated Formaldehyde/CO$_2$ Copolymer with Paraformaldehyde, Sn Cat. 3 (DBTL) and Base 1 (Cesium Carbonate)

A 200 ml, stainless steel reactor was initially charged with 15.34 g (corresponding to 0.511 mol of formaldehyde equivalents) of paraformaldehyde (Acros Organics), 1.64 g (5.03 mmol) of base 1 (Cs$_2$CO$_3$) and 9.8 mg of Sn cat. 3 (Borchi® Kat 28, containing tin bis(2-ethylhexanoate)). Then 40 ml of 1,4-dioxane were added. Subsequently, carbon dioxide was injected to 10 bar (absolute) and the reaction mixture was heated to 120° C. On attainment of the temperature of 120° C., the gauge pressure was adjusted to 30 bar (absolute) with carbon dioxide and the reaction mixture was stirred at 409 rpm with a sparging stirrer at 120° C. for 16 h. After cooling to 25° C., 30 mL of acetic anhydride were metered in at a flow rate of 1 mL/min with an HPLC pump while stirring. On completion of addition, the reaction mixture was heated to 60° C. while stirring at 409 rpm and stirred at 60° C. for 3 h. Thereafter, the reactor was cooled to 25° C. and the elevated pressure was released. A colorless inhomogeneous mixture consisting of liquid and solid constituents was obtained, The resultant product mixture was transferred to a beaker and saturated sodium carbonate solution was added dropwise until a pH of the solution of >7 was attained. After addition of 140 mL of dichloromethane, the resultant mixture was filtered through a paper filter. After the volatile constituents had been removed under reduced pressure, 5.48 g of a pale yellow oil having colorless solid particles were obtained.

Unlike the paraformaldehyde starting material, the product is soluble in dichloromethane and chloroform.

By means of gel permeation chromatography (GPC) against polystyrene standards with chloroform as eluent, a mean molecular weight M$_n$=799 g/mol and a polydispersity index PDI=1.19 were determined.

IR: ν=2981 (w, ν[CH$_2$]), 2918 (w, ν[CH$_2$]), 1750 (m, ν[C=O]), 1451 (w), 1430 (w), 1369 (w), 1227 (m), 1193 (s), 1145 (w), lilt (w), 1046 (w), 1009 (s), 979 (m), 915 (s), 821 (w), 606 (w), 519 (vw), 456 (w) cm$^{-1}$.

$^1$H-NMR (400 MHz, CDCl$_3$): δ=0.80-0.94 (m, 0.13H), 1.20-1.28 (m, 0.13H), 2.03-2.07 (m, 1.00H, CH$_3$), 3.35 (s, 0.10H), 4.67-4.69 (m, 0.10H, O—CH$_2$—O), 4.71 (s, 0.03H, O—CH$_2$—O), 4.82-4.90 (m, 0.52H, O—CH$_2$—O), 5.26-5.32 (m, 0.34H, O—CH$_2$—O), 5.68 (s, 0.16H, O—CH$_2$—O) ppm.

$^{13}$C APT NMR (400 MHz, CDCl$_3$): 8-11.7 (−), 13.9 (−), 20.7 (−, CH$_3$), 21.0 (−, CH$_3$), 22.6 (+), 24.9 (+), 29.4 (+), 31.1 (+), 48.2 (−), 55.9 (−), 56.0 (−), 79.2 (+, O—CH$_2$—O), 85.6 (+, O—CH$_2$—O), 86.9 (+, O—CH$_2$—O), 89.2 (+, O—CH$_2$—O), 90.2 (+, O—CH$_2$O), 90.7 (+, O—CH$_2$—O), 92.4 (+, OCH$_2$—O), 93.6 (+, O—CH$_2$—O), 95.3 (+, O—CH$_2$—O), 169.7 (+, C=O), 170.2 (+, C=O), 170.4 (+, C=O) ppm.

ESI-MS (FTMS+p ESI): In the ESI mass spectrum, the signal series with the greatest signal intensity identified were the following signal series, which are attributable to the following general empirical formula:

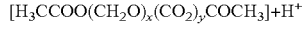

[H$_3$CCOO(CH$_2$O)$_x$(CO$_2$)$_y$COCH$_3$]+H$^+$

Series 1 (y=1): m/z (%) [x CH$_2$O]=357.11 (0.87) [7 CH$_2$O], 387.12 (1.61) [8 CH$_2$O], 417.13 (2.88) [9CH$_2$O], 447.14 (4.68) [10 CH$_2$O], 477.15 (6.33) [11 CH$_2$O], 507.17 (5.42) [12 CH$_2$O], 537.18 (4.78) [13 CH$_2$O], 567.19 (3.04) [14 CH$_2$O].

Series 2 (y=2): m/z (%) [x CH$_2$O]=371.09 (1.72) [6 CH$_2$O], 401.10 (6.30) [7 CH$_2$O], 431.11 (11.25) [8CH$_2$O], 461.12 (14.26) [9 CH$_2$O], 491.33 (17.50) [10 CH$_2$O], 521.15 (17.61) [11 CH$_2$O], 551.16 (14.90) [12 CH$_2$O], 581.17 (11.24) [13 CH$_2$O], 611.18 (7.97) [14 CH$_2$O], 641.19 (5.22) [15 CH$_2$O], 671.20 (3.23) [16 CH$_2$O], 701.21 (1.97) [17 CH$_2$O], Series 3 (y=3): m/z (%) [x CH$_2$O]=385.11 (3.74) [5 CH$_2$O], 415.12 (13.78) [6 CH$_2$O], 445.13 (26.95) [7 CH$_2$O], 475.14 (48.97) [8 CH$_2$O], 505.15 (83.20) [9 CH$_2$O], 535.16 (100.0) [10 CH$_2$O], 565.17 (94.00) [11 CH$_2$O], 595.18 (74.10) [12 CH$_2$O], 625.19 (53.15) [13 CH$_2$O], 655.20 (36.44) [14 CH$_2$O], 685.21 (23.88) [15 CH$_2$O], 715.22

(14.54) [16 CH₂O], 745.23 (8.74) [17 CH₂O], 775.25 (4.85) [18 CH₂O], 805.26 (2.70) [19 CH₂O], 835.27 (1.47) [20 CH₂O],

Series 4 (y=4): m/z (%) [x CH₂O]=489.12 (0.52) [7 CH₂O], 519.13 (0.81) [8 CH₂O], 549.14 (1.07) [9CH₂O], 579.35 (1.04) [10 CH₂O], 609.16 (0.83) [11 CH₂O], 639.17 (0.61) [12 CH₂O].

Thus, series 1 can be attributed to a nonalternating formaldehyde/$CO_2$ copolymer having one $CO_2$ unit and 7 to 14 formaldehyde units, series 2 to a nonalternating formaldehyde/$CO_2$ copolymer having 2 $CO_2$ units and 5 to 17 formaldehyde units, series 3 to a nonalternating formaldehyde/$CO_2$ copolymer having 3 $CO_2$ units and 5 to 20 formaldehyde units, and series 4 to a formaldehyde/$CO_2$ copolymer having 4 $CO_2$ units and 7 to 12 formaldehyde units. The most intense signal in the ESI mass spectrum was attributed to a formaldehyde/$CO_2$ copolymer having 3 $CO_2$ units and 10 formaldehyde units.

The relative ratio of formaldehyde units to $CO_2$ units in all chains is thus >1:1, which means that the presence of nonalternating formaldehyde/$CO_2$ copolymers has been proved beyond doubt.

Example 9

Preparation of an Acylated Formaldehyde/$CO_2$ Copolymer with Paraformaldehyde, Sn Cat. 1 (Bismuth Tris(2-Ethylhexanoate))) and Base 1 (Cesium Carbonate)

A 200 mL stainless steel reactor was initially charged with 15.00 g (corresponding to 0.500 mol of formaldehyde equivalents) of paraformaldehyde (Aeros Organics), 1.65 g (5.06 mmol) of base 1 ($Cs_2CO_3$) and 10.1 mg of Bi cat. 1 (Borchi® Kat 24, containing bismuth tris(2-ethylhexanoate)). Then 40 ml of 1,4-dioxane were added. Subsequently, carbon dioxide was injected to 10 bar (absolute) and the reaction mixture was heated to 120° C. On attainment of the temperature of 120° C., the gauge pressure was adjusted to 30 bar (absolute) with carbon dioxide and the reaction mixture was stirred at 415 rpm with a sparging stirrer at 120° C. for 16 h. After cooling to 25° C., 30 ml, of acetic anhydride were metered in at a flow rate of 5 mL/min with an HPLC pump while stirring, On completion of addition, the reaction mixture was heated to 60° C. while stirring at 415 rpm and stirred at 60° C. for 3 h. Thereafter, the reactor was cooled to 25° C. and the elevated pressure was released. A pale yellow homogeneous mixture was obtained. The resultant product mixture was transferred to a beaker and saturated sodium carbonate solution was added dropwise until a pH of the solution of >7 was attained. The product thus obtained was extracted with a total of 300 mL of dichloromethane. After the volatile constituents had been removed under reduced pressure, 12.69 g of a pale yellow oil having colorless solid particles were obtained.

Unlike the paraformaldehyde starting material, the product is soluble in dichloromethane and chloroform.

By means of gel permeation chromatography (GPC) against polystyrene standards with chloroform as eluent, a mean molecular weight $M_n$=648 g/mol and a polydispersity index PDI=1.19 were determined.

IR: v=3490 (b, vw, v[OH]), 2975 (w, v[$CH_2$]), 2904 (w, v[$CH_2$]), 1740 (m, v[C=O]), 1468 (w), 1421 (w), 1369 (w), 1224 (m), 1196 (m), 1110 (m), 1045 (m), 1008 (m), 917 (s), 833 (w), 606 (w), 532 (vw), 453 (vw) cm⁻¹.

¹H-NMR (400 MHz, CDCl₃): δ=2.01-2.03 (m, 1.00H, CH₃), 3.00-3.12 (m, 0.19H), 3.61 (s, 0.04H), 4.03-4.08 (m, 0.03H), 4.62-4.64 (m, 0.10H, O—CH₂—O), 4.67 (s, 0.03H, O—CH₂—O), 4.78-4.86 (m, 0.37H, O—CH₂O), 5.14-5.31 (m, 0.37H, O—CH₂—O), 5.64 (s, 0.09H, O—CH₂—O) ppm.

¹³C APT NMR (400 MHz, CDCl₃): δ=20.6 (-, CH₃), 20.9 (-, CH₃), 55.7 (-), 55.8 (-), 64.7 (+), 67.0 (+) 70.5 (+), 75.6 (+), 79.1 (+, O—CH₂—O), 85.1 (+, O—CH₂—O), 85.4 (+, O—CH₂O), 86.8 (+, O—CH₂—O), 88.6 (+, O—CH₂—O), 88.7 (+, O—CH₂—O), 89.0 (+, O—CH₂—O), 89.1 (+, O—CH₂—O), 90.1 (+, O—CH₂—O), 90.5 (+, O—CH₂—O), 93.5 (+, O—CH₂O), 95.0 (+, O—CH₂—O), 169.6 (+, C=O), 170.1 (+, C=O) ppm.

ESI-MS (FTMS+p ESI): In the ESI mass spectrum, the signal series with the greatest signal intensity identified were the following signal series, which are attributable to the following general empirical formula:

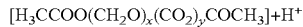

[H₃CCOO(CH₂O)ₓ(CO₂)ᵧCOCH₃]+H⁺

Series 1 (y=1): m/z (%) [x CH₂O]=357.12 (0.87) [7 CH₂O], 387.13 (1.64) [8 CH₂O], 417.14 (2.87) [9 CH₂O], 447.15 (4.97) [10 CH₂O], 477.16 (7.31) [11 CH₂O], 507.17 (5.85) [12 CH₂O], 537.18 (5.32) [13 CH₂O], 567.19 (4.66) [14 CH₂O].

Series 2 (y=2): m/z (%) [x CH₂O]=371.09 (1.60) [6 CH₂O], 401.31 (6.45) [7 CH₂O], 431.12 (11.39) [8 CH₂O], 461.13 (14.06) [9 CH₂O], 492.14 (17.11) [10 CH₂O], 521.15 (16.83) [11 CH₂O], 551.16 (14.36) [12 CH₂O], 581.17 (10.67) [13 CH₂O], 611.18 (7.68) [14 CH₂O], 641.19 (4.93) [15 CH₂O], 671.20 (3.10) [16 CH₂O], 701.21 (1.92) [17 CH₂O], 731.22 (0.99) [18 CH₂O].

Series 3 (y=3): m/z (%) [x CH₂O]=385.11 (3.43) [5 CH₂O], 415.12 (11.01) [6 CH₂O], 445.13 (25.91) [7 CH₂O], 475.14 (48.38) [8 CH₂O], 505.15 (82.53) [9 CH₂O], 535.16 (100.0) [10 CH₂O], 565.17 (94.14) [11 CH₂O], 595.18 (74.89) [12 CH₂O], 625.20 (53.50) [13 CH₂O], 655.21 (36.10) [14 CH₂O], 685.22 (23.17) [15 CH₂O], 715.23 (14.09) [16 CH₂O], 745.24 (8.47) [17 CH₂O], 775.25 (4.57) [18 CH₂O], 805.26 (2.35) [19CH₂O], 835.27 (1.30) [20 CH₂O].

Series 4 (y=4): m/z (%) [x CH₂O]=459.15 (3.66) [6 CH₂O], 489.16 (5.87) [7 CH₂O], 519.17 (7.94) [8 CH₂O], 549.18 (10.31) [9 CH₂O], 579.19 (12.90) [10 CH₂O], 609.20 (14.32) [11 CH₂O], 639.22 (11.27) [12 CH₂O], 699.23 (8.91) [13 CH₂O], 729.24 (6.18) [14 CH₂O], 759.25 (4.16) [15 CH₂O].

Thus, series 1 can be attributed to a nonalternating formaldehyde/$CO_2$ copolymer having one $CO_2$ unit and 7 to 14 formaldehyde units, series 2 to a nonalternating formaldehyde/$CO_2$ copolymer having 2 $CO_2$ units and 5 to 18 formaldehyde units, series 3 to a nonalternating formaldehyde/$CO_2$ copolymer having 3 $CO_2$ units and 5 to 20 formaldehyde units, and series 4 to a formaldehyde/$CO_2$ copolymer having 4 $CO_2$ units and 6 to 15 formaldehyde units. The most intense signal in the ESI mass spectrum was attributed to a formaldehyde/$CO_2$ copolymer having 3 $CO_2$ units and 10 formaldehyde units.

The relative ratio of formaldehyde units to $CO_2$ units in all chains is thus >1:1, which means that the presence of nonalternating formaldehyde/$CO_2$ copolymers has been proved beyond doubt.

Example 10

Preparation of an Acylated Formaldehyde/$CO_2$ Copolymer with Paraformaldehyde, Sn Cat. 1 (Zinc Bis(2-Ethylhexanoate)) and Base 1 (Cesium Carbonate) (Ratio of Base:Formaldehyde Equivalents A 200 mL stainless steel reactor was initially charged with 15.04 g (corresponding to 0.501 mol of formaldehyde equivalents) of paraformaldehyde (Acros Organics), 1.63 g (5.00 mmol) of base 1 ($Cs_2CO_3$) and 11.4 mg (1 mmol) of Zn cat. 1 (Borchi® Kat 22, containing zinc bis(2-ethylhexanoate)). Then 40 ml of 1,4-dioxane were added. Subsequently, carbon dioxide was injected to 10 bar (absolute) and the reaction mixture was heated to 120° C. On attainment of the temperature of 120° C., the gauge pressure was adjusted to 30 bar (absolute) with carbon dioxide and the reaction mixture was stirred at 452 rpm with a sparging stirrer at 120° C. for 16 h, After cooling to 25° C., 30 mL of acetic anhydride were metered in at a flow rate of 5 mL/min with an HPLC pump while stirring. On completion of addition, the reaction mixture was heated to 60° C. while stirring at 500 rpm and stirred at 60° C. for 3 h. Thereafter, the reactor was cooled to 25° C. and the elevated pressure was released, A colorless inhomogeneous mixture consisting of liquid and solid constituents was obtained. The resultant product mixture was transferred to a beaker and saturated sodium carbonate solution was added dropwise until a pH of the solution of >7 was attained. The resultant mixture was filtered through a Büchner filter under reduced pressure, The resultant filtrate was extracted with a total of 300 mL of dichloromethane. After the volatile constituents had been removed under reduced pressure, 5.14 g of a colorless oil were obtained.

Unlike the paraformaldehyde starting material, the product is soluble in dichloromethane and chloroform.

By means of gel permeation chromatography (GPC) against polystyrene standards with chloroform as eluent a mean molecular weight $M_n$=645 g/mol and a polydispersity index PDI=1.09 were determined.

IR: ν=2983 (w, ν[$CH_2$]), 2914 (w, ν[$CH_2$]), 1750 (m, ν[C=O]), 1431 (w), 1369 (m), 1226 (m), 1193 (s), 1145 (w), 1111 (w), 1086 (w), 1046 (w), 1009 (s), 980 (m), 917 (s), 821 (m), 605 (w), 518 (w), 455 (w) $cm^{-1}$.

$^1$H-NMR (400 MHz, $CDCl_3$): δ=1.97-2.00 (m, 1.00H, $CH_3$), 3.25-3.28 (m, 0.10H), 4.59-4.61 (m, 0.05H, O—$CH_2$—O), 4.63 (m, 0.01H, O—$CH_2$O), 4.72-4.84 (m, 0.28H, O—$CH_2$O), 5.19-5.26 (m, 0.25H, O—$CH_2$—O), 5.60 (s, 0.18H, O—$CH_2$—O) ppm.

$^{13}$C APT NMR (400 MHz, $CDCl_3$): δ=20.6 (−, $CH_3$), 20.8 (−, $CH_3$), 55.7 (−), 79.1 (+, O—$CH_2$—O), 85.4 (+, O—$CH_2$—O), 86.7 (+, O—$CH_2$—O), 88.6 (+, O—$CH_2$—O), 88.6 (+, O—$CH_2$—O), 88.7 (+, O—$CH_2$O), 89.0 (+, O—$CH_2$—O), 89.1 (+, O—$CH_2$—O), 90.0 (+, O—$CH_2$—O), 90.5 (+, O—$CH_2$—O), 90.5 (+, O—$CH_2$—O), 90.6 (+, O—$CH_2$O), 92.3 (+, O—$CH_2$—O), 93.5 (+, O—$CH_2$—O), 94.9 (+, O—$CH_2$—O), 169.4 (+, C=O) ppm.

ESI-MS (FTMS+p ESI): In the ESI mass spectrum, the signal series with the greatest signal intensity identified were the following signal series, which are attributable to the following general empirical formula:

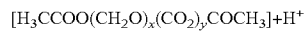

[$H_3$CCOO($CH_2$O)$_x$($CO_2$)$_y$COC$H_3$]+$H^+$

Series 1 (y=1): m/z (%) [x $CH_2$O]=297.09 (1.84) [5 $CH_2$O], 327.10 (4.83) [6 $CH_2$O], 357.11 (6.06) [7 $CH_2$O], 387.12 (17.85) [8 $CH_2$O], 417.13 (57.51) [9 $CH_2$O], 447.15 (43.49) [10 $CH_2$O], 477.16 (100.0) [11 $CH_2$O], 507.17 (58.17) [12 $CH_2$O], 537.18 (60.86) [13 $CH_2$O], 567.19 (57.10) [14 $CH_2$O], 597.20 (49.44) [15 $CH_2$O], 627.21 (39.63) [16 $CH_2$O], 657.22 (30.00) [17 $CH_2$O], 687.23 (20.44) [18 $CH_2$O], 717.24 (12.49) [19 $CH_2$O], 747.25 (7.32) [20 $CH_2$O], 777.26 (3.84) [21 $CH_2$O].

Series 2 (y=2): m/z (%) [x $CH_2$O]=341.08 (1.03) [5 $CH_2$O], 371.09 (3.60) [6 $CH_2$O], 401.10 (7.60) [7 $CH_2$O], 431.11 (10.46) [8 $CH_2$O], 461.13 (11.44) [9 $CH_2$O], 491.14 (11.04) [10 $CH_2$O], 521.15 (9.70) [11 $CH_2$O], 551.16 (7.79) [12 $CH_2$O], 581.17 (6.43) [13 $CH_2$O], 611.18 (5.02) [14 $CH_2$O], 641.19 (3.75) [15 $CH_2$O], 671.20 (2.86) [16 $CH_2$O], 701.21 (1.86) [17 $CH_2$O], 731.22 (1.29) [18 $CH_2$O], 761.28 (0.77) [19 $CH_2$O].

Series 3 (y=3): m/z (%) [x $CH_2$O]=385.11 (8.39) [5 $CH_2$O], 415.12 (22.08) [6 $CH_2$O], 445.13 (39.24) [7 $CH_2$O], 475.14 (52.13) [8 $CH_2$O], 505.15 (65.51) [9 $CH_2$O], 535.16 (72.70) [10 $CH_2$O], 565.17 (75.60) [11 $CH_2$O], 595.18 (73.43) [12 $CH_2$O], 625.19 (68.85) [13 $CH_2$O], 655.20 (59.93) [14 $CH_2$O], 685.22 (49.36) [15 $CH_2$O], 715.23 (37.77) [16 $CH_2$O], 745.24 (27.77) [17 $CH_2$O], 775.25 (18.84) [18 $CH_2$O], 805.26 (11.62) [19 $CH_2$O], 835.27 (6.91) [20 $CH_2$O], 865.28 (3.71) [21 $CH_2$O], 895.29 (2.12) [22 $CH_2$O], 925.30 (1.13) [23 $CH_2$O].

Series 4 (y=4): m/z (%) [x $CH_2$O]=459.15 (9.00) [6 $CH_2$O], 489.16 (23.99) [7 $CH_2$O], 519.17 (43.00) [8 $CH_2$O], 549.18 (33.15) [9 $CH_2$O], 579.19 (37.73) [10 $CH_2$O], 609.20 (34.37) [11 $CH_2$O], 639.21 (31.23) [12 $CH_2$O], 669.22 (27.06) [13 $CH_2$O], 699.23 (21.12) [14 $CH_2$O], 729.24 (15.86) [15 $CH_2$O], 759.25 (10.99) [16 $CH_2$O], 789.26 (7.15) [17 $CH_2$O], 819.27 (4.67) [18 $CH_2$O], 849.28 (2.86) [19 $CH_2$O].

Thus, series 1 can be attributed to a nonalternating formaldehyde/$CO_2$ copolymer having one $CO_2$ unit and 5 to 21 formaldehyde units, series 2 to a nonalternating formaldehyde/$CO_2$ copolymer having 2 $CO_2$ units and 5 to 19 formaldehyde units, series 3 to a nonalternating formaldehyde/$CO_2$ copolymer having 3 $CO_2$ units and 5 to 23 formaldehyde units, and series 4 to a formaldehyde/$CO_2$ copolymer having 4 $CO_2$ units and 6 to 19 formaldehyde units. It was not possible to attribute the most intense signal in the ESI mass spectrum (m/z=477.16) to any signal series. The signal having the second highest intensity was attributed to a formaldehyde/$CO_2$ copolymer having 3 $CO_2$ units and 11 formaldehyde units.

The relative ratio of formaldehyde units to $CO_2$ units in all chains is thus >1:1, which means that the presence of nonalternating formaldehyde/$CO_2$ copolymers has been proved beyond doubt.

Example 11

Preparation of an Acylated Formaldehyde/$CO_2$ Copolymer with Paraformaldehyde, Zn Cat. 1 (Zinc Bis(2-Ethylhexanoate)) and Base 1 (Cesium Carbonate)

A 200 mL stainless steel reactor was initially charged with 15.29 g (corresponding to 0.509 mol of formaldehyde equivalents) of paraformaldehyde (Acros Organics), 1.67 g (5.13 mmol) of base 1 ($Cs_2CO_3$) and 1.78 g of Zn cat. 1 (Borchi® Kat 22, containing zinc bis(2-ethylhexanoate)). Then 40 ml of 1,4-dioxane were added. Subsequently, carbon dioxide was injected to 10 bar (absolute) and the reaction mixture was heated to 120° C., On attainment of the temperature of 120° C., the gauge pressure was adjusted to 30 bar (absolute) with carbon dioxide and the reaction mixture was stirred at 500 rpm with a sparging stirrer at 120° C. for 16 h. After cooling to 25° C., 30 mL of acetic anhydride were metered in at a flow rate of 5 mL/min with an HPLC pump while stirring, On completion of addition, the reaction mixture was heated to 60° C. while stirring at 500 rpm and stirred at 60° C. for 3 h. Thereafter, the reactor was cooled to 25° C. and the elevated pressure was released. A colorless inhomogeneous mixture consisting of liquid and solid constituents was obtained. The resultant product mixture was transferred to a beaker and saturated sodium carbonate solution was added dropwise until a pH of the solution of >7 was attained. The resultant mixture was filtered through a paper filter. The resultant filtrate was extracted with a total of 300 mL of dichloromethane. After the volatile constituents had been removed under reduced pressure, 6.49 g of a colorless oil were obtained.

Unlike the paraformaldehyde starting material, the product is soluble in dichloromethane and chloroform, By means of gel permeation chromatography (GPC) against polystyrene standards with chloroform as eluent, a mean molecular weight $M_n$=877 g/mol and a polydispersity index PDI=1.76 were determined.

IR: $v$=2965 (w, $v[CH_2]$), 2938 (w, $v[CH_2]$), 1749 (m, $v[C=O]$), 1452 (w), 1417 (w), 1369 (w), 1226 (m), 1194 (m), 1145 (w), 1111 (m), 1047 (w), 1009 (m), 980 (m), 916 (s), 821 (w), 606 (w), 519 (vw), 455 (w) cm$^{-1}$.

$^1$H-NMR (400 MHz, CDCl$_3$): δ=0.80-0.88 (m, 0.13H), 1.23 (bs, 1.24, 0.08H), 2.02-2.05 (m, 1.00H, CH$_3$), 3.31-3.33 (m, 0.31H), 3.63 (s, 0.01H), 4.64-4.67 (m, 0.07H, O—CH$_2$—O), 4.69 (s, 0.01H, O—CH$_2$—O), 4.80-4.87 (m, 0.37H, O—CH$_2$—O), 5.26-5.30 (in, 0.31H, O—CH$_2$—O), 5.66 (s, 0.17H, O—CH$_2$—O) ppm.

$^{13}$C APT NMR (400 MHz, CDCl$_3$): δ=11.8 (−), 13.9 (−), 20.6 (−, CH$_3$), 21.0 (−, CH$_3$), 22.6 (+), 25.3 (+), 29.6 (+), 31.5 (+), 47.1 (−), 55.8 (−), 67.0 (+), 79.1 (+, O—CH$_2$—O), 85.1 (+, O—CH$_2$—O), 85.5 (+, O—CH$_2$—O), 86.9 (+, O—CH$_2$—O), 88.7 (+, O—CH$_2$—O), 88.8 (+, O—CH$_2$—O), 89.1 (+, O—CH$_2$—O), 90.2 (+, O—CH$_2$O), 90.6 (+, O—CH$_2$—O), 92.4 (+, O—CH$_2$—O), 93.6 (+, O—CH$_2$—O), 95.1 (+, O—CH$_2$—O), 169.7 (+, C=O), 170.1 (+, C=O), 170.4 (+, C=O), 181.1 (+, C=O) ppm.

Example 12

Preparation of an Acylated Formaldehyde/CO$_2$ Copolymer with Paraformaldehyde, Cu Cat. 1 (Copper Bis(2-Ethylhexanoate)/Copper Naphthenate)) and Base 1 (Cesium Carbonate)

A 200 mL stainless steel reactor was initially charged with 15.00 g (corresponding to 0.500 mol of formaldehyde equivalents) of paraformaldehyde (Acros Organics), 1.65 g (5.06 mmol) of base 1 (Cs$_2$CO$_3$) and 1.77 g of Cu cat. 1 (Soligen® Copper 8, containing copper bis(2-ethylhexanoate) and copper naphthenate). Then 40 ml of 1,4-dioxane were added. Subsequently, carbon dioxide was injected to 10 bar (absolute) and the reaction mixture was heated to 120° C. On attainment of the temperature of 120° C., the gauge pressure was adjusted to 30 bar (absolute) with carbon dioxide and the reaction mixture was stirred at 500 rpm with a sparging stirrer at 120° C. for 16 h. After cooling to 25° C., 30 mL of acetic anhydride were metered in at a flow rate of 1 mL/min with an HPLC pump while stirring. On completion of addition, the reaction mixture was heated to 60° C. while stirring at 500 rpm and stirred at 60° C. for 3 h. Thereafter, the reactor was cooled to 25° C. and the elevated pressure was released, A pale blue inhomogeneous mixture consisting of liquid and solid constituents was obtained. The resultant product mixture was transferred to a beaker and saturated sodium carbonate solution was added dropwise until a pH of the solution of >7 was attained. After addition of 300 mL of dichloromethane, the resultant mixture was transferred into a separating funnel and the organic phase was removed. After the volatile constituents had been removed under reduced pressure, the residue was taken up in diethyl ether and filtered through a paper filter, and the filtration residue was washed with dichloromethane. After the volatile constituents had been removed under reduced pressure, 4.49 g of a pale green oil having colorless solid particles were obtained.

Unlike the paraformaldehyde starting material, the product is soluble in dichloromethane and chloroform.

By means of gel permeation chromatography (GPC) against polystyrene standards with chloroform as eluent a mean molecular weight $M_n$=861 g/mol and a polydispersity index PDI=1.26 were determined.

IR: $v$=2964 (w, $v[CH_2]$), 2917 (w, $v[CH_2]$), 1749 (m, $v[C=O]$), 1465 (w), 1420 (w), 1369 (w), 1226 (m), 1195 (m), 1144 (w), 1110 (m), 1008 (m), 980 (m), 913 (s), 822 (w), 736 (w), 606 (w), 532 (vw), 456 (w) cm$^{-1}$.

1H-NMR (400 MHz, CDCl3): δ=1.92-1.95 (m, 1.00H, CH3), 3.20-3.23 (m, 0.03H), 4.54-4.56 (m, 0.04H, O—CH2-O), 4.58 (s, 0.01H, O—CH2-O), 4.70-4.77 (m, 0.30H, OCH2-O), 5.15-5.20 (m, 0.20H, O—CH2-O), 5.55 (s, 0.20H, O—CH2-O) ppm.

13C APT NMR (400 MHz, CDCl3): δ=20.3 (−, CH3), 20.5 (−, CH3), 55.5 (−), 78.9 (+, O—CH2-O), 84.9 (+, O—CH2-O), 85.3 (+, O—CH2-O), 86.6 (+, O—CH2-O), 88.4 (+, O—CH2-O), 88.9 (+, O—CH2-O), 89.9 (+, O—CH2-O), 90.4 (+, O—CH2-O), 92.2 (+, OCH2-O), 93.3 (+, O—CH2-O), 94.8 (+, O—CH2-O), 169.3 (+, C=O), 169.8 (+, C=O), 169.9 (+, C=O), 170.0 (+, C=O) ppm.

Examples 7 to 12 show that, even when Sn eat. 1 (DBTL) is exchanged for other Lewis-acidic components, formaldehyde/CO$_2$ copolymers of the invention are obtained. The Lewis-acidic components tested in examples 7 to 32 include both compounds containing main group elements (tin, main group 4; bismuth, main group 5) as Lewis-acidic center and compounds containing transition group elements (copper, transition group 9; zinc, transition group 10) as Lewis-acidic center.

Example 13

Preparation of a Formaldehyde/CO$_2$ Copolymer with Paraformaldehyde, Sn Cat. 1 (DBTL) and Base 2 (DABCO)

A 200 mL stainless steel reactor was initially charged with 15.1 g (corresponding to 0.50 mol of formaldehyde equivalents) of paraformaldehyde (Aldrich), 5.64 g (50.3 mmol) of base 2 (DABCO) and 3.39 mg (5.37 mmol) of Sn cat. 1 (DBTL) under an argon atmosphere. Then 367 mg (4.95 mmol) of tert-butanol and 40 mL of 1,4-dioxane were added in an argon countercurrent. Subsequently, carbon dioxide was injected to 10 bar (absolute) and the reaction mixture was heated to 120° C. On attainment of the temperature of 120° C., the gauge pressure was adjusted to 30 bar (absolute) with carbon dioxide and the reaction mixture was stirred at 500 rpm with a sparging stirrer at 120° C. for 16 h. After cooling to 25° C., the elevated pressure was released and 50 mL of dist. water were added to the reactor while stirring. The resulting mixture was filtered through a paper filter. Volatile constituents were distilled out of the filtrate on a rotary evaporator at 100-70 mbar and 40° C. The distillation residue obtained was 1.55 g of a viscous oil.

By means of gel permeation chromatography (GPC) against PMMA standards with DMF as eluent, a mean molecular weight $M_n$=461 g/mol and a polydispersity index PDI=1.60 were determined.

The incorporation of CO$_2$ into the polymer was demonstrated by the characteristic signal in the IR spectrum at 1772 cm$^{-1}$ and in the $^{13}$C APT NMR spectrum at δ=178.2 ppm ($C_{quart}$) (see examples 1 and 2).

Example 14

Preparation of a Formaldehyde/CO$_2$ Copolymer with Paraformaldehyde, Sn Cat. 1 (DBTL) and Base 2 (DABCO)

A 200 mL stainless steel reactor was initially charged with 15.0 g (corresponding to 0.50 mol of formaldehyde equivalents) of paraformaldehyde (Aldrich), 5.59 g (49.8 mmol) of base 2 (DABCO) and 3.17 mg (5.02 mmol) of Sn cat. 1 (DBTL) under an argon atmosphere. Then 382 mg (5.30 mmol) of tert-butanol and 40 mL of 1,4-dioxane were added in an argon countercurrent. Subsequently, carbon dioxide was injected to 10 bar (absolute) and the reaction mixture was heated to 120° C. On attainment of the temperature of 120° C., the gauge pressure was adjusted to 30 bar (absolute) with carbon dioxide and the reaction mixture was stirred at 500 rpm with a sparging stirrer at 120° C. for 16 h. After cooling to 25° C., the resulting mixture was transferred into a 250 mL round-bottom flask and volatile constituents were distilled off on a rotary evaporator at 100-70 mbar and 40° C. The distillation residue obtained was 20.7 g of a viscous oil.

By means of gel permeation chromatography (GPC) against PMMA standards, a mean molecular weight $M_n$=446 g/mol and a polydispersity index PDI=1.68 were determined.

The incorporation of CO$_2$ into the polymer was demonstrated by the characteristic signal in the IR spectrum at 1770 cm$^{-1}$ (shoulder) and the characteristic signals in the $^{13}$C APT NMR spectrum at δ=175.4 and 173.0 ppm ($C_{quart}$) (see examples 1 and 2).

Example 13 and 14 show that, even when base 1 (cesium carbonate, inorganic base) is exchanged for organic bases (base 2, DABCO) as basic component, formaldehyde/CO2 copolymers of the invention are obtained.

Reference Experiments

Comparative Example 1

Reaction of Paraformaldehyde and Carbon Dioxide in the Absence of a Catalyst A 200 mL stainless steel reactor was initially charged with 15.2 g (corresponding to 0.51 mol of formaldehyde equivalents) of paraformaldehyde (Aldrich) under an argon atmosphere. Then 40 ml of 1,4-dioxane were added in an argon countercurrent. Subsequently, carbon dioxide was injected to 10 bar (absolute) and the reaction mixture was heated to 120° C. On attainment of the temperature of 120° C., the gauge pressure was adjusted to 30 bar (absolute) with carbon dioxide and the reaction mixture was stirred at 500 rpm with a sparging stirrer at 120° C. for 16 h. After cooling to 25° C., the elevated pressure was released. The mixture present in the reactor was filtered through a paper filter and the solids were washed with dimethylformamide (DMF). Volatile constituents were distilled out of the filtrate on a rotary evaporator at 300-3 mbar and 50° C. The distillation residue obtained was 1.28 g of a colorless wax.

In the IR spectrum, aside from weak signals for DMF, the product showed substantial consistency with the paraformaldehyde feedstock. Apart from the signal characteristic of DMF, it was not possible to find any carbonyl signal between 1700 and 1800 cm$^{-1}$ in the IR spectrum.

This comparative example demonstrates that, in contrast to the inventive examples, no reaction takes place between paraformaldehyde and carbon dioxide when no catalyst is added to the reaction mixture under otherwise identical conditions.

Comparative Example 2

Reaction of Paraformaldehyde with CO$_2$ in the Presence of Sn Cat. 1 (DBTL) as Lewis-Acidic Component without Addition of a Basic Component A 200 mL stainless steel reactor was initially charged with 15.09 g (corresponding to 0.503 mol of formaldehyde equivalents) of paraformaldehyde (Aldrich), 3.16 g (5.0 mmol) of Sn cat. 1 (DBTL) and 3.08 g of molecular sieve (3 Å). The reactor was closed, evacuated at 1×10$^{-2}$ bar and flooded with argon. Then 40 ml of 1,4-dioxane were added in an argon countercurrent. Subsequently, carbon dioxide was injected to 10 bar (absolute) and the reaction mixture was heated to 120° C. On attainment of the temperature of 120° C., the gauge pressure was adjusted to 30 bar (absolute) with carbon dioxide and the reaction mixture was stirred at 500 rpm with a sparging stirrer at 120° C. for 16 h. After cooling to 25° C., the elevated pressure was released. A dark brown oil was found, The volatile constituents were distilled off on a rotary evaporator at 300-3 mbar and 50° C. The distillation residue obtained was 11.62 g of a viscous dark brown oil.

In the IR spectrum, no signal was found between 1740 and 1800 cm$^{-1}$ (carbonate region). In the $^{13}$C APT NMR spectrum, no quaternary $^{13}$C signal for a carbonate group was observed between 170 and 180 ppm. Thus, no incorporation of CO$_2$ was observed.

This comparative example demonstrates that, in contrast to the inventive examples, no incorporation of carbon dioxide in the form of carbonate groups takes place when exclusively a Lewis-acidic component (Sn cat. 1, DBTL) is added to the reaction mixture in the absence of a basic component under otherwise identical conditions.

Comparative Example 3

Reaction of Paraformaldehyde with CO$_2$ in the Presence of Base 1 (Cesium Carbonate) as Basic Component without Addition of a Lewis-Acidic Component A 200 mL stainless steel reactor was initially charged with 15.04 g (corresponding to 0.501 mol of formaldehyde equivalents) of paraformaldehyde (Aldrich) and 1.63 g (4.99 mmol) of base 1 (Cs$_2$CO$_3$). Then 40 ml of 1,4-dioxane were added. Subsequently, carbon dioxide was injected to 10 bar (absolute) and the reaction mixture was heated to 120° C. On attainment of the temperature of 120° C., the gauge pressure was adjusted to 30 bar (absolute) with carbon dioxide and the reaction mixture was stirred at 500 rpm with a sparging stirrer at 120° C. for 16 h. After cooling to 25° C., the elevated pressure was released. A colorless suspension of a colorless solid was obtained. The solids were filtered off using a paper filter and washed with DMF. The volatile constituents of the filtrate were distilled off on a rotary evaporator at 300-3 mbar and 50° C. The distillation residue obtained was 4.38 g of a colorless waxy solid.

In the IR spectrum, aside from weak signals for DMF, the product showed substantial consistency with the paraformaldehyde feedstock. Apart from the signal characteristic of DMF, it was not possible to find any carbonyl signal between 1700 and 1800 cm$^{-1}$ in the IR spectrum. In the $^{13}$C APT NMR spectrum, no quaternary $^{13}$C signal for a carbonate group was observed between 170 and 180 ppm.

This comparative example demonstrates that, in contrast to the inventive examples, no reaction between paraformaldehyde and carbon dioxide takes place when exclusively a basic component (base 1, cesium carbonate) is added to the reaction mixture in the absence of a Lewis-acidic component under otherwise identical conditions.

Comparative Example 4

Reworking of an Experiment According to the Prior Art (Sharma, Preprints of Symposia—American Chemica 2000, 676) with Aqueous Formaldehyde Solution and DMAP In a 200 mL stainless steel reactor, a mixture of 40 mL (43.4 g, corresponding to 0.528 mol of formaldehyde) of a 36.5% aqueous formaldehyde solution and 2.37 g (19.4 mmol) of 4-(dimethylamino)pyridine (DMAP) was frozen, and 18.1 g (0.411 mol) of dry ice were added under the cold conditions. The reactor was closed directly and the reaction mixture was heated to 120° C. while stirring. On attainment of the temperature of 120° C., the reaction mixture was stirred at 500 rpm with a sparging stirrer at 120° C. for 72 h. After cooling to 25° C., the elevated pressure was released and the resultant reaction mixture was extracted 2× with 50 mL of diethyl ether. Volatile constituents were distilled out of the aqueous fraction on a rotary evaporator at 70 mbar and 40° C. The distillation residue obtained was 2.85 g of a viscous yellow oil. The IR spectrum showed consistency with the DMAP starting material. In the $^1$H and $^{13}$C NMR spectra, only DMAP was detected.

This comparative example demonstrates that, under the conditions specified in the literature, no nonalternating formaldehyde/CO$_2$ copolymer is formed.

Comparative Example 5

Reworking of an Experiment According to the Prior Art (Sharma, Preprints of Symposia—American Chemica 2000, 676) with Paraformaldehyde, DMAP and 1,4-Dioxane In a 200 mL stainless steel reactor, a mixture of 10.27 g (corresponding to 0.342 mol of formaldehyde equivalents) of paraformaldehyde (Aldrich), 1.53 g (12.5 mmol) of 4-(dimethylamino)pyridine (DMAP) and 20 mL of 1,4-dioxane was frozen, and 10.9 g (0.248 mol) of dry ice were added under the cold conditions. The reactor was closed immediately and the reaction mixture was heated to 175° C. while stirring. On attainment of the temperature of 120° C., the reaction mixture was stirred at 500 rpm with a sparging stirrer at 175° C. for 24 h. After cooling to 25° C., the elevated pressure was released and 20 mL of methanol were added to the reactor while stirring. Volatile constituents were distilled out of the resultant mixture on a rotary evaporator at 300 mbar and 40° C. The distillation residue obtained was 1.37 g of a viscous dark brown oil. The IR spectrum showed consistency with the paraformaldehyde starting material. No carbonyl band was observed.

This comparative example demonstrates that, under the conditions specified in the literature, no nonalternating formaldehyde/CO$_2$ copolymer is formed.

Comparative Example 6

Reworking of an Experiment According to the Prior Art (Sharma, Preprints of Symposia—American Chemica 2000, 676) with Paraformaldehyde DABCO and 1,4-Dioxane In a 200 mL stainless steel reactor, a mixture of 10.1 g (corresponding to 0.336 mol of formaldehyde equivalents) of paraformaldehyde (Aldrich), 2.44 g (23.8 mmol) of 1,4-diazabicyclo[2.2.2]octane (DABCO) and 26.8 mL of 1,4-dioxane was frozen, and 11.5 g (0.261 mol) of dry ice were added under the cold conditions. The reactor was closed immediately and the reaction mixture was heated to 120° C. while stirring. On attainment of the temperature of 120° C., the reaction mixture was stirred at 500 rpm with a sparging stirrer at 120° C. for 48 h. After cooling to 25° C., the elevated pressure was released and 20 mL of methanol were added to the reactor while stirring. The resulting mixture was filtered through a paper filter. Volatile constituents were distilled out of the filtrate on a rotary evaporator at 100 mbar and 40° C. The distillation residue obtained was 4.94 g of a viscous orange oil, The IR spectrum showed consistency with the paraformaldehyde starting material. No carbonyl band was observed.

This comparative example demonstrates that, under the conditions specified in the literature, no nonalternating formaldehyde/CO$_2$ copolymer is formed.

According to comparative examples 4 to 6, the reworking of the reaction under the conditions described in the literature lead to products having a deep brown color and a caramel odor. Tins is a consequence of unwanted side reactions, especially the foremose reaction, which leads to formation of carbohydrates from formaldehyde. Neither the carbonyl band in the IR spectrum at 1750 cm$^{-1}$ cited in the prior art nor any of the carbonyl bands observed in the IR spectrum at 1730 to 1780 cm$^{-1}$ in the inventive examples were detectable in comparative experiments 4 to 6. The comparative examples thus demonstrate that, under the conditions specified in the literature, no nonalternating formaldehyde/CO$_2$ copolymers are formed.

The invention claimed is:

1. A process for preparing nonalternating formaldehyde/CO$_2$ copolymers, the process comprising the step of reacting formaldehyde or a formaldehyde-releasing compound with carbon dioxide in the presence of a catalyst system, wherein the catalyst system comprises a Lewis-acidic metal component selected from the group consisting of boron, tin, zinc, copper, bismuth, molybdenum, tungsten, vanadium, and combinations thereof, and a basic component with a pK$_b$ of ≥0, wherein the catalyst system takes the form of a frustrated Lewis pair, and the Lewis-acidic component under reaction conditions is at least intermittently coordinatively unsaturated.

2. The process as claimed in claim 1, wherein the basic component is selected from the group consisting of alkali metal carbonates, alkali metal carboxylates, 1,4-diazabicyclo[2.2.2]octane (DABCO), 4-(dimethylamino)pyridine (DMAP), 1,8-diazabicyclo[5.4.0]undec-7-ene (DBU), triazabicyclo[4.4.0]dec-5-ene (TBD), 7-methyl-1,5,7-triazabicyclo[4.4.0]dec-5-ene (MTBD), 2,6-lutidine, N-heterocyclic carbenes, trimesitylphosphine, and combinations thereof.

3. The process as claimed in claim 1, wherein the Lewis-acidic component is in a molar ratio of 1:100 000 to 1:10 relative to formaldehyde or the formaldehyde equivalents present in the formaldehyde-releasing compound.

4. The process as claimed in claim 1, wherein the basic component is in a molar ratio of 1:100 000 to 1:1 relative to formaldehyde or the formaldehyde equivalents present in the formaldehyde-releasing compound.

5. The process as claimed in claim 1, wherein the molar ratio of Lewis-acidic component to basic component is 1:2000 to 10:1.

6. The process as claimed in claim 1, wherein the resulting nonalternating formaldehyde/CO2 copolymer is stabilized by addition of epoxides.

7. The process as claimed in claim 1, wherein the resulting nonalternating formaldehyde/$CO_2$ copolymer is stabilized by addition of cyclic acetals.

8. The process as claimed in claim 1, wherein the resulting nonalternating formaldehyde/$CO_2$ copolymer is stabilized by addition of carboxylic anhydrides.

9. The process as claimed in claim 1, wherein the resulting nonalternating formaldehyde/$CO_2$ copolymer is stabilized by addition of organic carbonates.

10. The process as claimed in claim 1, wherein the resulting nonalternating formaldehyde/$CO_2$ copolymer is stabilized by addition of organic isocyanates.

11. A nonalternating formaldehyde/$CO_2$ copolymer obtained by a process as claimed in claim 1, having a molar ratio of formaldehyde units to $CO_2$ units between >1:1 and 30:1, and a number-average molecular weight of 400 to 5000 g/mol.

12. A copolymer as claimed in claim 11, having an average of 1 to 50 OH groups per polymer chain.

13. A process for preparing nonalternating formaldehyde/$CO_2$ copolymers, the process comprising reacting formaldehyde or a formaldehyde-releasing compound with carbon dioxide in the presence of a catalyst system, wherein
the catalyst system comprises a Lewis-acidic component, and a basic component with a $pK_b$ of ≥0, wherein the catalyst system takes the form of a frustrated Lewis pair, and the formaldehyde/$CO_2$ copolymer has a molar ratio of formaldehyde units to $CO_2$ units between >1:1 and 30:1, and a number-average molecular weight of 400 to 5000 g/mol.

14. The process as claimed in claim 11, wherein the formaldehyde/$CO_2$ copolymer has an average of 1 to 50 OH groups per polymer chain.

15. The process as claimed in claim 11, wherein the Lewis-acidic component comprises a metal selected from the group of boron, tin, bismuth, zinc, copper, molybdenum, tungsten, vanadium, and any one combination thereof.

16. The process as claimed in claim 1, wherein the formaldehyde/$CO_2$ copolymer exhibits a carbonyl band in an IR spectrum at 1730 to 1780 $cm^{-1}$.

17. The process as claimed in claim 13, wherein the formaldehyde/$CO_2$ copolymer exhibits a carbonyl band in an IR spectrum at 1730 to 1780 $cm^{-1}$.

18. The copolymer as claimed in claim 11 exhibits a carbonyl band in an IR spectrum at 1730 to 1780 $cm^{-1}$.

* * * * *